(12) United States Patent
Penner et al.

(10) Patent No.: US 10,423,301 B2
(45) Date of Patent: *Sep. 24, 2019

(54) SECTIONS OF A PRESENTATION HAVING USER-DEFINABLE PROPERTIES

(71) Applicant: Microsoft Technology Licensing, LLC, Redmond, WA (US)

(72) Inventors: Nathan Penner, Redmond, WA (US); Shawn Villaron, Redmond, WA (US); Dachuan Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 326 days.

This patent is subject to a terminal disclaimer.

(21) Appl. No.: 14/617,659

(22) Filed: Feb. 9, 2015

(65) Prior Publication Data

US 2015/0253941 A1    Sep. 10, 2015

Related U.S. Application Data

(63) Continuation of application No. 13/361,009, filed on Jan. 30, 2012, now Pat. No. 8,954,857, which is a
(Continued)

(51) Int. Cl.
   *G06F 3/0482* (2013.01)
   *G06F 3/0481* (2013.01)
   (Continued)

(52) U.S. Cl.
   CPC .......... *G06F 3/0482* (2013.01); *G06F 3/0481* (2013.01); *G06F 3/04817* (2013.01);
   (Continued)

(58) Field of Classification Search
   CPC .. G06F 3/0482; G06F 3/0481; G06F 3/04817; G06F 17/24; G06F 3/04842; G06F 16/168
   See application file for complete search history.

(56) References Cited

U.S. PATENT DOCUMENTS

| 4,831,552 A | 5/1989 | Scully et al. |
| 5,107,443 A | 4/1992 | Smith et al. |

(Continued)

FOREIGN PATENT DOCUMENTS

| CN | 1551567 A | 12/2004 |
| CN | 1723431 A | 1/2006 |

(Continued)

OTHER PUBLICATIONS

"Non-Final Office Action Received for U.S. Appl. No. 13/361,009", dated Apr. 14, 2014, 44 Pages.

(Continued)

*Primary Examiner* — Tadesse Hailu
(74) *Attorney, Agent, or Firm* — Merchant & Gould P.C.

(57) ABSTRACT

In general, this disclosure describes techniques that employ user-defined values of properties of sections of an electronic presentation. As described herein, a user may configure a presentation to include a plurality of sections. Each of the sections includes zero or more slides of the electronic slide presentation. In addition to the slides associated with each section, each of the sections is associated with one or more properties having values that can be defined by an author of the presentation. Because the values of the properties of the sections are user-definable, these properties may, in some implementations of these techniques, enable the author of the presentation to use the sections in ways not possible in presentation applications that merely use sections as a means of grouping thumbnail images of slides for navigation among slides in an authoring interface.

20 Claims, 9 Drawing Sheets

Related U.S. Application Data continuation of application No. 12/189,583, filed on Aug. 11, 2008, now Pat. No. 8,108,777.

(51) Int. Cl.
  *G06F 16/16* (2019.01)
  *G06F 17/24* (2006.01)
  *G06F 3/0484* (2013.01)

(52) U.S. Cl.
  CPC ........ *G06F 3/04842* (2013.01); *G06F 16/168* (2019.01); *G06F 17/24* (2013.01)

(56) References Cited

U.S. PATENT DOCUMENTS

| | | |
|---|---|---|
| 5,195,086 A | 3/1993 | Baumgartner et al. |
| 5,220,657 A | 6/1993 | Bly et al. |
| 5,297,250 A | 3/1994 | Leroy et al. |
| 5,495,269 A | 2/1996 | Elrod et al. |
| 5,566,291 A | 10/1996 | Boulton et al. |
| 5,572,644 A | 11/1996 | Liaw et al. |
| 5,649,105 A | 7/1997 | Aldred et al. |
| 5,652,866 A | 7/1997 | Aldred et al. |
| 5,675,520 A | 10/1997 | Pit et al. |
| 5,675,752 A | 10/1997 | Scott et al. |
| 5,689,641 A | 11/1997 | Ludwig et al. |
| 5,704,029 A | 12/1997 | Wright, Jr. |
| 5,717,869 A | 2/1998 | Moran et al. |
| 5,758,110 A | 5/1998 | Boss et al. |
| 5,793,365 A | 8/1998 | Tang et al. |
| 5,802,299 A | 9/1998 | Logan et al. |
| 5,821,925 A | 10/1998 | Carey et al. |
| 5,821,932 A | 10/1998 | Pittore |
| 5,874,958 A | 2/1999 | Ludolph |
| 5,893,098 A | 4/1999 | Peters et al. |
| 5,907,324 A | 5/1999 | Larson et al. |
| 5,956,489 A | 9/1999 | San Andres et al. |
| 5,960,173 A | 9/1999 | Tang et al. |
| 5,990,888 A | 11/1999 | Blades et al. |
| 6,008,807 A | 12/1999 | Bretschneider et al. |
| 6,014,135 A | 1/2000 | Fernandes |
| 6,016,478 A | 1/2000 | Zhang et al. |
| 6,018,346 A | 1/2000 | Moran et al. |
| 6,041,333 A | 3/2000 | Bretschneider et al. |
| 6,101,480 A | 8/2000 | Conmy et al. |
| 6,119,147 A | 9/2000 | Toomey et al. |
| 6,128,629 A | 10/2000 | Bretschneider et al. |
| 6,144,991 A | 11/2000 | England |
| 6,192,395 B1 | 2/2001 | Lerner et al. |
| 6,208,339 B1 | 3/2001 | Atlas et al. |
| 6,215,498 B1 | 4/2001 | Filo et al. |
| 6,230,185 B1 | 5/2001 | Salas et al. |
| 6,237,025 B1 | 5/2001 | Ludwig et al. |
| 6,249,281 B1 | 6/2001 | Chen et al. |
| 6,314,408 B1 | 11/2001 | Salas et al. |
| 6,353,436 B1 | 3/2002 | Reichlen |
| 6,363,352 B1 | 3/2002 | Dailey et al. |
| 6,369,835 B1 | 4/2002 | Lin |
| 6,396,500 B1 | 5/2002 | Qureshi et al. |
| 6,396,512 B1 | 5/2002 | Nickerson |
| 6,421,655 B1 | 7/2002 | Horvitz et al. |
| 6,438,564 B1 | 8/2002 | Morton et al. |
| 6,469,711 B2 | 10/2002 | Foreman et al. |
| 6,473,749 B1 | 10/2002 | Smith et al. |
| 6,522,347 B1 | 2/2003 | Tsuji et al. |
| 6,546,246 B1 | 4/2003 | Bridges et al. |
| 6,546,405 B2 | 4/2003 | Gupta et al. |
| 6,553,417 B1 | 4/2003 | Gampper |
| 6,586,349 B1 | 7/2003 | Jeon et al. |
| 6,608,636 B1 | 8/2003 | Roseman |
| 6,630,944 B1 | 10/2003 | Kakuta et al. |
| 6,633,315 B1 | 10/2003 | Sobeski et al. |
| 6,639,836 B1 | 10/2003 | Hung et al. |
| 6,670,970 B1 | 12/2003 | Bonura et al. |
| 6,735,615 B1 | 5/2004 | Iwayama et al. |
| 6,738,075 B1 | 5/2004 | Torres et al. |
| 6,744,447 B2 | 6/2004 | Estrada et al. |
| 6,757,365 B1 | 6/2004 | Bogard |
| 6,819,338 B2 | 11/2004 | Heasman et al. |
| 6,834,371 B1 | 12/2004 | Jensen et al. |
| 6,853,988 B1 | 2/2005 | Dickinson et al. |
| 6,926,799 B1 | 8/2005 | Yeom et al. |
| 6,933,495 B1 | 8/2005 | Yeom et al. |
| 6,938,032 B1 | 8/2005 | Heath et al. |
| 6,981,223 B2 | 12/2005 | Becker et al. |
| 7,007,067 B1 | 2/2006 | Azvine et al. |
| 7,035,865 B2 | 4/2006 | Doss et al. |
| 7,036,076 B2 | 4/2006 | Anwar |
| 7,051,285 B1 | 5/2006 | Harrison et al. |
| 7,058,647 B1 | 6/2006 | Hill |
| 7,062,532 B1 | 6/2006 | Sweat et al. |
| 7,073,127 B2 | 7/2006 | Zhao et al. |
| 7,075,513 B2 | 7/2006 | Silfverberg et al. |
| 7,076,546 B1 | 7/2006 | Bates et al. |
| 7,124,123 B1 | 10/2006 | Roskind et al. |
| 7,124,164 B1 | 10/2006 | Chemtob |
| 7,143,356 B1 | 11/2006 | Shafrir et al. |
| 7,171,567 B1 | 1/2007 | Bayer et al. |
| 7,185,054 B1 | 2/2007 | Ludwig et al. |
| 7,203,479 B2 | 4/2007 | Deeds |
| 7,206,773 B2 | 4/2007 | Erol et al. |
| 7,213,051 B2 | 5/2007 | Zhu et al. |
| 7,225,257 B2 | 5/2007 | Aoike et al. |
| 7,233,933 B2 | 6/2007 | Horvitz et al. |
| 7,233,971 B1 | 6/2007 | Levy |
| 7,242,389 B1 | 7/2007 | Stern |
| 7,246,316 B2 | 7/2007 | Furlong et al. |
| 7,246,317 B2 | 7/2007 | Karasawa et al. |
| 7,248,677 B2 | 7/2007 | Randall et al. |
| 7,251,786 B2 | 7/2007 | Wynn et al. |
| 7,266,568 B1 | 9/2007 | Erol et al. |
| 7,266,773 B2 | 9/2007 | Dorwart |
| 7,269,787 B2 | 9/2007 | Amitay et al. |
| 7,284,203 B1 | 10/2007 | Meeks et al. |
| 7,299,193 B2 | 11/2007 | Cragun et al. |
| 7,299,405 B1 | 11/2007 | Lee et al. |
| 7,299,418 B2 | 11/2007 | Dieberger |
| 7,363,581 B2 | 4/2008 | Parks et al. |
| 7,373,505 B2 | 5/2008 | Seltzer et al. |
| 7,392,475 B1 | 6/2008 | Leban et al. |
| 7,401,300 B2 | 7/2008 | Nurmi |
| 7,421,660 B2 | 9/2008 | Charnock et al. |
| 7,426,297 B2 | 9/2008 | Zhang et al. |
| 7,447,713 B1 | 11/2008 | Berkheimer |
| 7,451,186 B2 | 11/2008 | Morinigo et al. |
| 7,454,439 B1 | 11/2008 | Gansner et al. |
| 7,466,334 B1 | 12/2008 | Baba |
| 7,469,222 B1 | 12/2008 | Glazer |
| 7,478,129 B1 | 1/2009 | Chemtob |
| 7,493,561 B2 | 2/2009 | Sareen et al. |
| 7,512,906 B1 | 3/2009 | Baier et al. |
| 7,526,726 B1 | 4/2009 | Skwarecki et al. |
| 7,533,146 B1 | 5/2009 | Kumar |
| 7,546,533 B2 | 6/2009 | Sareen et al. |
| 7,554,576 B2 | 6/2009 | Erol et al. |
| 7,555,784 B2 | 6/2009 | Cameron et al. |
| 7,571,210 B2 | 8/2009 | Swanson et al. |
| 7,590,939 B2 | 9/2009 | Sareen et al. |
| 7,590,941 B2 | 9/2009 | Wee et al. |
| 7,599,989 B2 | 10/2009 | Stevens et al. |
| 7,606,862 B2 | 10/2009 | Swearingen et al. |
| 7,624,110 B2 | 11/2009 | Alagna et al. |
| 7,627,830 B1 | 12/2009 | Espinoza et al. |
| 7,636,754 B2 | 12/2009 | Zhu et al. |
| 7,640,506 B2 | 12/2009 | Pratley et al. |
| 7,669,141 B1 | 2/2010 | Pegg |
| 7,679,518 B1 | 3/2010 | Pabla et al. |
| 7,720,698 B1 | 5/2010 | Gulko et al. |
| 7,730,411 B2 | 6/2010 | Chotai et al. |
| 7,743,098 B2 | 6/2010 | Anglin et al. |
| 7,743,331 B1 | 6/2010 | Fleischer et al. |
| 7,764,247 B2 | 7/2010 | Blanco et al. |
| 7,770,116 B2 | 8/2010 | Zhang et al. |
| 7,774,221 B2 | 8/2010 | Miller et al. |

(56) References Cited

U.S. PATENT DOCUMENTS

| | | |
|---|---|---|
| 7,799,706 B2 | 9/2010 | Yeom et al. |
| 7,818,678 B2 | 10/2010 | Massand |
| 7,822,200 B2 | 10/2010 | Cameron et al. |
| 7,869,941 B2 | 1/2011 | Coughlin et al. |
| 7,882,565 B2 | 2/2011 | Collins et al. |
| 7,911,409 B1 | 3/2011 | Chatterjee et al. |
| 7,919,142 B2 | 4/2011 | Yeom et al. |
| 7,941,399 B2 | 5/2011 | Bailor et al. |
| 7,962,525 B2 | 6/2011 | Kansal |
| 7,984,387 B2 | 7/2011 | Batthish et al. |
| 7,992,089 B2 | 8/2011 | Murray et al. |
| 8,032,832 B2 | 10/2011 | Russ et al. |
| 8,099,458 B2 | 1/2012 | Burtne et al. |
| 8,108,777 B2 | 1/2012 | Penner et al. |
| 8,126,974 B2 | 2/2012 | Lyle et al. |
| 8,150,719 B2 | 4/2012 | Perrella et al. |
| 8,161,419 B2 | 4/2012 | Palahnuk et al. |
| 8,204,942 B2 | 6/2012 | Roskind et al. |
| 8,214,748 B2 | 7/2012 | Srikanth et al. |
| 8,330,795 B2 | 12/2012 | Iyer et al. |
| 8,358,762 B1 | 1/2013 | Renner et al. |
| 8,385,964 B2 | 2/2013 | Haney |
| 8,423,883 B1 | 4/2013 | Stockmann |
| 8,437,461 B1 | 5/2013 | Gartner et al. |
| 8,452,839 B2 | 5/2013 | Heikes et al. |
| 8,517,888 B1 | 8/2013 | Brookins |
| 8,560,487 B2 | 10/2013 | Jhoney et al. |
| 8,583,148 B2 | 11/2013 | Ollila et al. |
| 8,606,517 B1 | 12/2013 | Ehrlacher et al. |
| 8,631,119 B2 | 1/2014 | Malkin et al. |
| 8,682,973 B2 | 3/2014 | Kikin-Gil et al. |
| 8,768,308 B2 | 7/2014 | Kim et al. |
| 8,826,117 B1 | 9/2014 | Junee et al. |
| 8,954,857 B2 | 2/2015 | Penner et al. |
| 9,544,158 B2 | 1/2017 | Kotler et al. |
| 9,996,241 B2 | 6/2018 | Kikin-Gil et al. |
| 2001/0040592 A1 | 11/2001 | Foreman et al. |
| 2002/0001106 A1 | 1/2002 | Lan |
| 2002/0044683 A1 | 4/2002 | Deshpande et al. |
| 2002/0059604 A1 | 5/2002 | Papagan et al. |
| 2002/0060201 A1 | 5/2002 | Yeom et al. |
| 2002/0062403 A1 | 5/2002 | Burnett et al. |
| 2002/0065848 A1* | 5/2002 | Walker ............... G06F 17/24 715/205 |
| 2002/0078007 A1 | 6/2002 | Herrero |
| 2002/0101446 A1 | 8/2002 | Tang et al. |
| 2002/0109712 A1 | 8/2002 | Yacovone et al. |
| 2002/0130904 A1 | 9/2002 | Becker et al. |
| 2002/0138389 A1 | 9/2002 | Martone et al. |
| 2002/0143876 A1 | 10/2002 | Boyer et al. |
| 2002/0143877 A1 | 10/2002 | Hackbarth et al. |
| 2002/0143885 A1 | 10/2002 | Ross, Jr. |
| 2002/0147777 A1 | 10/2002 | Hackbarth et al. |
| 2002/0156787 A1 | 10/2002 | Jameson et al. |
| 2002/0164151 A1 | 11/2002 | Jasinschi et al. |
| 2002/0174085 A1 | 11/2002 | Nelson et al. |
| 2003/0005053 A1 | 1/2003 | Novaes |
| 2003/0014409 A1 | 1/2003 | Shukoor |
| 2003/0020805 A1 | 1/2003 | Allen et al. |
| 2003/0038831 A1 | 2/2003 | Engelfriet |
| 2003/0048291 A1 | 3/2003 | Dieberger |
| 2003/0052915 A1 | 3/2003 | Brown et al. |
| 2003/0061284 A1 | 3/2003 | Mandarino et al. |
| 2003/0081785 A1 | 5/2003 | Boneh et al. |
| 2003/0097273 A1 | 5/2003 | Carpenter et al. |
| 2003/0101043 A1 | 5/2003 | Boegelund et al. |
| 2003/0110228 A1 | 6/2003 | Xu et al. |
| 2003/0122863 A1 | 7/2003 | Dieberger et al. |
| 2003/0135558 A1 | 7/2003 | Bellotti et al. |
| 2003/0135559 A1 | 7/2003 | Bellotti et al. |
| 2003/0137539 A1 | 7/2003 | Dees |
| 2003/0142133 A1 | 7/2003 | Brown et al. |
| 2003/0142145 A1 | 7/2003 | Bennett et al. |
| 2003/0158900 A1 | 8/2003 | Santos |
| 2003/0160814 A1 | 8/2003 | Brown |
| 2003/0167339 A1 | 9/2003 | Zhu et al. |
| 2003/0172174 A1 | 9/2003 | Mihalcheon |
| 2003/0177190 A1 | 9/2003 | Moody et al. |
| 2003/0204815 A1 | 10/2003 | Edwards et al. |
| 2003/0209519 A1 | 11/2003 | Yeom et al. |
| 2003/0222890 A1 | 12/2003 | Salesin et al. |
| 2003/0222900 A1 | 12/2003 | Schramm-Apple et al. |
| 2003/0231202 A1 | 12/2003 | Parker et al. |
| 2004/0001079 A1 | 1/2004 | Zhao et al. |
| 2004/0001106 A1 | 1/2004 | Deutscher et al. |
| 2004/0015595 A1 | 1/2004 | Lin et al. |
| 2004/0016876 A1 | 1/2004 | Yeom et al. |
| 2004/0017396 A1 | 1/2004 | Werndorfer et al. |
| 2004/0024822 A1 | 2/2004 | Werndorfer et al. |
| 2004/0027370 A1 | 2/2004 | Jaeger |
| 2004/0030992 A1 | 2/2004 | Moisa et al. |
| 2004/0034622 A1 | 2/2004 | Espinoza et al. |
| 2004/0062383 A1 | 4/2004 | Sylvain |
| 2004/0071453 A1 | 4/2004 | Valderas |
| 2004/0085354 A1 | 5/2004 | Massand |
| 2004/0109021 A1 | 6/2004 | Price |
| 2004/0113934 A1 | 6/2004 | Kleinman et al. |
| 2004/0123157 A1 | 6/2004 | Alagna et al. |
| 2004/0125128 A1 | 7/2004 | Chang et al. |
| 2004/0128350 A1 | 7/2004 | Topfl et al. |
| 2004/0128691 A1 | 7/2004 | Egawa et al. |
| 2004/0150627 A1 | 8/2004 | Luman et al. |
| 2004/0153456 A1 | 8/2004 | Charnock et al. |
| 2004/0161090 A1 | 8/2004 | Digate et al. |
| 2004/0169683 A1 | 9/2004 | Chiu et al. |
| 2004/0174392 A1 | 9/2004 | Bjoernsen et al. |
| 2004/0175036 A1 | 9/2004 | Graham |
| 2004/0196286 A1 | 10/2004 | Guzik |
| 2004/0205653 A1 | 10/2004 | Hadfield et al. |
| 2004/0210845 A1 | 10/2004 | Paul et al. |
| 2004/0254998 A1 | 12/2004 | Horvitz |
| 2004/0263636 A1 | 12/2004 | Cutler et al. |
| 2004/0267701 A1 | 12/2004 | Horvitz et al. |
| 2004/0267871 A1 | 12/2004 | Pratley et al. |
| 2005/0005025 A1 | 1/2005 | Harville et al. |
| 2005/0018828 A1 | 1/2005 | Nierhaus et al. |
| 2005/0021754 A1* | 1/2005 | Alda ................ G06F 9/4488 709/225 |
| 2005/0055625 A1 | 3/2005 | Kloss |
| 2005/0057584 A1 | 3/2005 | Gruen et al. |
| 2005/0081160 A1 | 4/2005 | Wee et al. |
| 2005/0088410 A1 | 4/2005 | Chaudhri |
| 2005/0091571 A1 | 4/2005 | Leichtling |
| 2005/0091596 A1 | 4/2005 | Anthony et al. |
| 2005/0125246 A1 | 6/2005 | Muller et al. |
| 2005/0125717 A1 | 6/2005 | Segal et al. |
| 2005/0138109 A1 | 6/2005 | Redlich et al. |
| 2005/0138570 A1 | 6/2005 | Good et al. |
| 2005/0149442 A1 | 7/2005 | Adams et al. |
| 2005/0171830 A1 | 8/2005 | Miller et al. |
| 2005/0187937 A1* | 8/2005 | Kawabe ............ G06F 21/6218 |
| 2005/0193221 A1* | 9/2005 | Yoneyama ........ G06F 21/6218 726/5 |
| 2005/0235351 A1 | 10/2005 | Seltzer et al. |
| 2005/0246642 A1 | 11/2005 | Valderas et al. |
| 2005/0278331 A1 | 12/2005 | Hatori |
| 2005/0289127 A1* | 12/2005 | Giampaolo ....... G06F 17/30126 |
| 2005/0289453 A1 | 12/2005 | Segal et al. |
| 2006/0004911 A1 | 1/2006 | Becker et al. |
| 2006/0010023 A1 | 1/2006 | Tromczynski et al. |
| 2006/0010197 A1 | 1/2006 | Ovenden |
| 2006/0020581 A1* | 1/2006 | Dettinger ........... G06F 21/6227 |
| 2006/0026253 A1 | 2/2006 | Kessen et al. |
| 2006/0036950 A1 | 2/2006 | Himberger et al. |
| 2006/0053380 A1 | 3/2006 | Spataro et al. |
| 2006/0067250 A1 | 3/2006 | Boyer et al. |
| 2006/0067578 A1 | 3/2006 | Fuse |
| 2006/0080610 A1 | 4/2006 | Kaminsky |
| 2006/0082594 A1 | 4/2006 | Vafiadis et al. |
| 2006/0132507 A1 | 6/2006 | Wang |
| 2006/0136828 A1 | 6/2006 | Asano |
| 2006/0143063 A1 | 6/2006 | Braun et al. |
| 2006/0146765 A1 | 7/2006 | Van de sluis et al. |
| 2006/0161585 A1 | 7/2006 | Clarke et al. |

(56) References Cited

U.S. PATENT DOCUMENTS

| | | |
|---|---|---|
| 2006/0167996 A1 | 7/2006 | Orsolini et al. |
| 2006/0168533 A1 | 7/2006 | Yip et al. |
| 2006/0171515 A1 | 8/2006 | Hintermeister et al. |
| 2006/0184872 A1 | 8/2006 | Dontcheva et al. |
| 2006/0190547 A1 | 8/2006 | Bhogal et al. |
| 2006/0195587 A1 | 8/2006 | Cadiz et al. |
| 2006/0198517 A1 | 9/2006 | Cameron et al. |
| 2006/0200667 A1 | 9/2006 | Cameron et al. |
| 2006/0213443 A1 | 9/2006 | Yeom et al. |
| 2006/0234735 A1 | 10/2006 | Digate et al. |
| 2006/0235732 A1* | 10/2006 | Miller .................. G06Q 10/06 705/7.23 |
| 2006/0239212 A1 | 10/2006 | Pirzada et al. |
| 2006/0259875 A1 | 11/2006 | Collins et al. |
| 2006/0265398 A1 | 11/2006 | Kaufman |
| 2006/0265659 A1 | 11/2006 | Collins et al. |
| 2006/0282759 A1 | 12/2006 | Collins et al. |
| 2006/0284981 A1* | 12/2006 | Erol .................. G06F 17/30244 348/207.1 |
| 2006/0294046 A1 | 12/2006 | Sareen et al. |
| 2006/0294468 A1 | 12/2006 | Sareen et al. |
| 2006/0294469 A1 | 12/2006 | Sareen et al. |
| 2007/0005752 A1 | 1/2007 | Chawla et al. |
| 2007/0011231 A1 | 1/2007 | Manion et al. |
| 2007/0056045 A1* | 3/2007 | Collins ............. G06F 17/30011 726/27 |
| 2007/0074268 A1 | 3/2007 | Pepper et al. |
| 2007/0100937 A1 | 5/2007 | Burtner et al. |
| 2007/0106724 A1 | 5/2007 | Gorti et al. |
| 2007/0112926 A1 | 5/2007 | Brett et al. |
| 2007/0118598 A1* | 5/2007 | Bedi .................. G06Q 10/107 709/204 |
| 2007/0150583 A1 | 6/2007 | Asthana et al. |
| 2007/0168447 A1 | 7/2007 | Chen et al. |
| 2007/0174389 A1 | 7/2007 | Armstrong et al. |
| 2007/0185870 A1 | 8/2007 | Hogue et al. |
| 2007/0188520 A1 | 8/2007 | Finley et al. |
| 2007/0189487 A1 | 8/2007 | Sharland et al. |
| 2007/0214423 A1 | 9/2007 | Teplov et al. |
| 2007/0219645 A1 | 9/2007 | Thomas et al. |
| 2007/0226032 A1 | 9/2007 | White et al. |
| 2007/0245238 A1 | 10/2007 | Fugitt et al. |
| 2007/0253424 A1 | 11/2007 | Herot et al. |
| 2007/0271592 A1* | 11/2007 | Noda .................. G06F 21/6218 726/1 |
| 2007/0276909 A1 | 11/2007 | Chavda et al. |
| 2007/0279416 A1 | 12/2007 | Cobb et al. |
| 2007/0294612 A1 | 12/2007 | Drucker et al. |
| 2007/0300185 A1 | 12/2007 | Macbeth et al. |
| 2008/0005235 A1 | 1/2008 | Hegde et al. |
| 2008/0008458 A1 | 1/2008 | Gudipaty et al. |
| 2008/0013698 A1 | 1/2008 | Holtzberg |
| 2008/0022225 A1 | 1/2008 | Erl |
| 2008/0025691 A1 | 1/2008 | Kinoshita et al. |
| 2008/0040187 A1 | 2/2008 | Carraher et al. |
| 2008/0040188 A1 | 2/2008 | Klausmeier |
| 2008/0059889 A1 | 3/2008 | Parker |
| 2008/0065580 A1 | 3/2008 | Spence et al. |
| 2008/0066016 A1 | 3/2008 | Dowdy et al. |
| 2008/0070218 A1 | 3/2008 | Ahl et al. |
| 2008/0084984 A1 | 4/2008 | Levy et al. |
| 2008/0098328 A1 | 4/2008 | Rollin et al. |
| 2008/0114844 A1 | 5/2008 | Sanchez et al. |
| 2008/0115076 A1 | 5/2008 | Frank et al. |
| 2008/0136897 A1 | 6/2008 | Morishima et al. |
| 2008/0141126 A1 | 6/2008 | Johnson et al. |
| 2008/0177782 A1 | 7/2008 | Poston et al. |
| 2008/0189616 A1 | 8/2008 | Coulomb et al. |
| 2008/0189624 A1 | 8/2008 | Chotai et al. |
| 2008/0195981 A1 | 8/2008 | Pulier et al. |
| 2008/0239995 A1 | 10/2008 | Lee et al. |
| 2008/0263460 A1 | 10/2008 | Altberg et al. |
| 2008/0276174 A1 | 11/2008 | Hintermeister et al. |
| 2008/0288889 A1 | 11/2008 | Hunt et al. |
| 2008/0300944 A1 | 12/2008 | Surazski et al. |
| 2008/0303746 A1 | 12/2008 | Schlottmann et al. |
| 2008/0307322 A1 | 12/2008 | Stochosky et al. |
| 2008/0313544 A1 | 12/2008 | Kleinman et al. |
| 2008/0320082 A1 | 12/2008 | Kuhlke et al. |
| 2009/0006980 A1 | 1/2009 | Hawley et al. |
| 2009/0006982 A1 | 1/2009 | Curtis et al. |
| 2009/0007003 A1 | 1/2009 | Dukhon et al. |
| 2009/0007014 A1 | 1/2009 | Coomer et al. |
| 2009/0019367 A1 | 1/2009 | Cavagnari et al. |
| 2009/0030766 A1 | 1/2009 | Denner et al. |
| 2009/0037821 A1 | 2/2009 | O'Neal et al. |
| 2009/0037848 A1 | 2/2009 | Tewari et al. |
| 2009/0043856 A1 | 2/2009 | Darby |
| 2009/0044117 A1 | 2/2009 | Vaughan et al. |
| 2009/0055739 A1 | 2/2009 | Murillo et al. |
| 2009/0089055 A1 | 4/2009 | Caspi et al. |
| 2009/0092068 A1* | 4/2009 | Moritomo ......... H04W 52/0225 370/311 |
| 2009/0094367 A1 | 4/2009 | Song et al. |
| 2009/0109180 A1 | 4/2009 | Do et al. |
| 2009/0112703 A1 | 4/2009 | Brown |
| 2009/0119255 A1 | 5/2009 | Frank et al. |
| 2009/0119604 A1 | 5/2009 | Simard et al. |
| 2009/0129596 A1 | 5/2009 | Chavez et al. |
| 2009/0138552 A1 | 5/2009 | Johnson et al. |
| 2009/0138826 A1 | 5/2009 | Barros |
| 2009/0183095 A1 | 7/2009 | Deitsch et al. |
| 2009/0204671 A1 | 8/2009 | Hawkins et al. |
| 2009/0210793 A1 | 8/2009 | Yee et al. |
| 2009/0222741 A1 | 9/2009 | Shaw et al. |
| 2009/0222763 A1 | 9/2009 | Dukhon et al. |
| 2009/0228569 A1 | 9/2009 | Kalmanje et al. |
| 2009/0234721 A1 | 9/2009 | Bigelow et al. |
| 2009/0235166 A1 | 9/2009 | Keohane et al. |
| 2009/0235177 A1 | 9/2009 | Saul et al. |
| 2009/0249223 A1 | 10/2009 | Barsook et al. |
| 2009/0254843 A1 | 10/2009 | Van wie et al. |
| 2009/0265632 A1 | 10/2009 | Russ et al. |
| 2009/0282339 A1 | 11/2009 | Van melle et al. |
| 2009/0300501 A1 | 12/2009 | Miller et al. |
| 2009/0309846 A1 | 12/2009 | Trachtenberg et al. |
| 2009/0313584 A1 | 12/2009 | Kerr et al. |
| 2009/0319562 A1 | 12/2009 | Holm-Petersen et al. |
| 2010/0005398 A1 | 1/2010 | Pratley et al. |
| 2010/0031152 A1 | 2/2010 | Villaron et al. |
| 2010/0037140 A1 | 2/2010 | Penner et al. |
| 2010/0037151 A1 | 2/2010 | Ackerman et al. |
| 2010/0058201 A1 | 3/2010 | Harvey et al. |
| 2010/0097331 A1 | 4/2010 | Wu |
| 2010/0114691 A1 | 5/2010 | Wu et al. |
| 2010/0114991 A1 | 5/2010 | Chaudhary et al. |
| 2010/0131868 A1 | 5/2010 | Chawla et al. |
| 2010/0138756 A1 | 6/2010 | Saund et al. |
| 2010/0149307 A1 | 6/2010 | Iyer et al. |
| 2010/0174993 A1 | 7/2010 | Pennington et al. |
| 2010/0201707 A1 | 8/2010 | Rasmussen et al. |
| 2010/0235216 A1 | 9/2010 | Hehmeyer et al. |
| 2010/0235763 A1 | 9/2010 | Massand |
| 2010/0241968 A1 | 9/2010 | Tarara et al. |
| 2010/0251140 A1 | 9/2010 | Tipirneni |
| 2010/0268705 A1 | 10/2010 | Douglas et al. |
| 2010/0279266 A1 | 11/2010 | Laine et al. |
| 2010/0306004 A1 | 12/2010 | Burtner et al. |
| 2010/0306018 A1 | 12/2010 | Burtner et al. |
| 2010/0312706 A1 | 12/2010 | Combet et al. |
| 2010/0324963 A1 | 12/2010 | Gupta et al. |
| 2011/0022967 A1 | 1/2011 | Vijayakumar et al. |
| 2011/0105092 A1 | 5/2011 | Felt et al. |
| 2011/0107241 A1 | 5/2011 | Moore |
| 2011/0113348 A1 | 5/2011 | Twiss et al. |
| 2011/0113351 A1 | 5/2011 | Phillips |
| 2011/0137894 A1 | 6/2011 | Narayanan et al. |
| 2011/0154180 A1 | 6/2011 | Evanitsky et al. |
| 2011/0161130 A1 | 6/2011 | Whalin et al. |
| 2011/0167036 A1* | 7/2011 | Liebman .............. G11B 27/034 707/608 |
| 2011/0185288 A1 | 7/2011 | Gupta et al. |
| 2011/0212430 A1 | 9/2011 | Smithmier et al. |

(56) References Cited

U.S. PATENT DOCUMENTS

| | | |
|---|---|---|
| 2011/0239142 A1 | 9/2011 | Steeves et al. |
| 2011/0282871 A1 | 11/2011 | Seefeld et al. |
| 2011/0289142 A1 | 11/2011 | Whalin et al. |
| 2011/0289433 A1 | 11/2011 | Whalin et al. |
| 2011/0295879 A1 | 12/2011 | Logis et al. |
| 2012/0023418 A1 | 1/2012 | Frields et al. |
| 2012/0050197 A1 | 3/2012 | Kemmochi |
| 2012/0075337 A1 | 3/2012 | Rasmussen et al. |
| 2012/0078708 A1 | 3/2012 | Taylor et al. |
| 2012/0129347 A1 | 5/2012 | Yeom et al. |
| 2012/0131464 A1 | 5/2012 | Penner et al. |
| 2012/0144325 A1 | 6/2012 | Mital et al. |
| 2012/0150577 A1 | 6/2012 | Berg et al. |
| 2012/0150863 A1 | 6/2012 | Fish et al. |
| 2012/0159347 A1 | 6/2012 | Fish et al. |
| 2012/0159355 A1 | 6/2012 | Fish et al. |
| 2012/0166985 A1 | 6/2012 | Friend et al. |
| 2012/0179980 A1 | 7/2012 | Whalin et al. |
| 2012/0179981 A1 | 7/2012 | Whalin et al. |
| 2012/0233543 A1 | 9/2012 | Vagell et al. |
| 2013/0007103 A1 | 1/2013 | Braun et al. |
| 2013/0035853 A1 | 2/2013 | Stout et al. |
| 2013/0091205 A1 | 4/2013 | Kotler et al. |
| 2013/0091440 A1 | 4/2013 | Kotler et al. |
| 2013/0091465 A1 | 4/2013 | Kikin-gil et al. |
| 2013/0097544 A1 | 4/2013 | Parker et al. |
| 2013/0101978 A1 | 4/2013 | Ahl et al. |
| 2013/0124978 A1 | 5/2013 | Horns et al. |
| 2013/0132886 A1 | 5/2013 | Mangini et al. |
| 2013/0154946 A1 | 6/2013 | Sakuramata et al. |
| 2013/0211980 A1 | 8/2013 | Heiferman et al. |
| 2013/0212494 A1 | 8/2013 | Heiferman et al. |
| 2013/0239002 A1 | 9/2013 | Maloney et al. |
| 2013/0246903 A1 | 9/2013 | Mukai |
| 2013/0263020 A1 | 10/2013 | Heiferman et al. |
| 2014/0033068 A1 | 1/2014 | Gupta et al. |
| 2014/0207867 A1 | 7/2014 | Kotler et al. |
| 2014/0317561 A1 | 10/2014 | Robinson et al. |
| 2015/0127628 A1 | 5/2015 | Rathod |

FOREIGN PATENT DOCUMENTS

| | | |
|---|---|---|
| CN | 1928859 A | 3/2007 |
| CN | 1992625 A | 7/2007 |
| CN | 101689188 A | 3/2010 |
| CN | 101834905 A | 9/2010 |
| DE | 10003907 A1 | 8/2000 |
| EP | 674291 A2 | 9/1995 |
| EP | 1478121 A2 | 11/2004 |
| EP | 1517260 A2 | 3/2005 |
| EP | 1628198 A2 | 2/2006 |
| EP | 2316059 A2 | 5/2011 |
| JP | H04257046 A | 9/1992 |
| JP | 06062142 A | 3/1994 |
| JP | H0784905 A | 3/1995 |
| JP | 07-261963 A | 10/1995 |
| JP | H08161214 A | 6/1996 |
| JP | 08272578 A | 10/1996 |
| JP | H1125076 A | 1/1999 |
| JP | 2000050226 A | 2/2000 |
| JP | 2001-022257 A | 1/2001 |
| JP | 2002149754 A | 5/2002 |
| JP | 2004287525 A | 10/2004 |
| JP | 2004336794 A | 11/2004 |
| JP | 2005500740 A | 1/2005 |
| JP | 2005-5352701 A | 12/2005 |
| JP | 2006-59361 A | 3/2006 |
| JP | 2006163732 A | 6/2006 |
| JP | 4721663 B2 | 7/2011 |
| JP | 2011-530769 A | 12/2011 |
| KR | 101015295 B1 | 2/2011 |
| RU | 2005 139 793 A | 6/2007 |
| RU | 2312390 C2 | 12/2007 |
| RU | 2324987 C2 | 5/2008 |
| TW | 200615840 A | 5/2006 |
| WO | 94/28480 A1 | 12/1994 |
| WO | 02061682 A1 | 8/2002 |
| WO | 2005098630 A1 | 10/2005 |
| WO | 2006100475 A1 | 9/2006 |
| WO | 2006/124140 A2 | 11/2006 |
| WO | 2006124137 A2 | 11/2006 |
| WO | 2007092470 A2 | 8/2007 |
| WO | 2009/087999 A1 | 7/2009 |
| WO | 2010/014294 A1 | 2/2010 |
| WO | 2010/019349 A2 | 2/2010 |

OTHER PUBLICATIONS

"Office Action Issued in Malaysia Patent Application No. PI 2011000144", dated Feb. 13, 2015, 3 Pages.

Office Action Received for Chinese Patent Application No. 200980131157.5, dated Jul. 6, 2015, 8 Pages.

Taiwan Office Action and Search Report Received for Patent Application No. 98126585, dated Aug. 4, 2014, 15 Pages.

Notice of Allowance Received for Russian Federation Patent Application No. 2011103151, dated Sep. 4, 2013, Filed Date: Jun. 7, 2009, 18 Pages.

Russian Notice of Allowance dated Jan. 21, 2013 in Application No. 2011105032, 22 pgs.

Office Action dated Jul. 7, 2015, in U.S. Appl. No. 12/184,174, 34 pgs.

"Microsoft Word's Click and Type Feature", published by SnipTools, Nov. 12, 2003 downloaded Jun. 28, 2015 from http://sniptools.com/vault/microsoft-words-click-and-type-feature; 2 pgs.

Canadian Office Action dated Aug. 18, 2015 in Application No. 2,730,019, 3 pgs.

Korean Notice of Allowance dated Jun. 25, 2015 in Application No. 10-2011-7003276, 2 pgs.

"An Overview of Aabel 3 Features" accessed at: http://www.gigawiz.com/Aabel.html; accessed on Jul. 21, 2010, 19 pages.

"Collaboration within the Telepresence Experience" accessed at: http://www.wrplatinum.com/Downloads/11056.aspx; published Jan. 2010, 11 pages.

"Content Applications", Products—Content Applications, http://web.archive.org/web/20030810211219/www.documentum.com/products/content_a . . . , Aug. 10, 2003, 2 pages.

"CounterPoint: A Zooming Presentation Tool"; http://web.archive.org/web/20050205082738/www.cs.umd.edu/hcil/counterpoint/, Archive.org 2005 Capture, 3 pgs.

"Create treemaps using easy drag and drop interactions" accessed at: http://www.magnaview.nl/treemap/; accessed on Jul. 21, 2010, 1 page.

"CSS Max-width Property" by W3Schools, archived by Internet Archive WaybackMachine Jun. 8, 2007, downloaded Nov. 16, 2012; 1 pg.

"Delivering format transformation and analysis for all content," EMC Documentum Content Transformation Services, Copyright 2006, 4 pages.

"First Examination Report Received in Australian Patent Application No. 2009282364", dated Mar. 17, 2014, Filed Date: Jul. 19, 2009, 3 Pages.

"Microsoft Office Picture Manager Basics" Nov. 8, 2006, 4 pages.

"Microsoft Office Picture Manager," Microsoft Office Picture Manager accessed at: http://en.wikipedia.org/wiki/Microsoft_Office_Picture_Manager; accessed on Dec. 13, 2007, 2 pages.

"Office Action and Search Report Received for Taiwan Patent Application No. 98126585", dated Aug. 4, 2014, 15 Pages.

"Office Action Received in Japanese Patent Application No. 2011-523026", dated Mar. 7, 2014, Filed Date: Jul. 19, 2009, 4 Pages.

"SpanSoft," Software from SpanSoft at Download-By.Net, copyright 2006, 4 pages.

"The Beginner's Guide to Data Visualization" accessed at: http://www.tableausoftware.com/beginners-data-visualization; accessed on Jul. 21, 2010, 6 pages.

"The Platinum Experience of Collaboration—CollaboratorHYPERMAX", accessed at: http://www.businessoctane.com/group_telepresence.php; accessed on Jul. 16, 2010, 7 pages.

(56) References Cited

OTHER PUBLICATIONS

"What is Slide Librarian," Slide Librarian, Current Version 2.4; accessed at: http://www.spansoft.org/slide_rt.htm; accessed on Dec. 7, 2007, 3 pages.
Chilean Office Action Summary dated Aug. 17, 2012 in Appln No. 282-2011.
Chinese Fifth Office Action dated May 30, 2014 in Appln No. 200980131157.5, 9 pgs.
Chinese Fourth Office Action dated Nov. 21, 2013 in Appln No. 200980137757.5, 11 pgs.
Chinese Office Action dated Aug. 31, 2012 in Appln No. 200980131157.5.
Chinese Office Action dated Nov. 16, 2012 in Appln No. 200980131705.4.
Chinese Second Office Action dated Jan. 30, 2013 in Appln No. 200980131157.5.
Chinese Third Office Action dated Jul. 23, 2013 in Appln No. 200980137757.5, 8 pgs.
Davis et al., "Collaboration within the Telepresence Experience" accessed at: http://www.wrplatinum.com/Downloads/11056.aspx; published Jan. 2010, 11 pages.
Deneba Systems, Inc., Canvas Tips and Techniques, © 1995-2002, 9 pages; http://www.acdamerica.com/support-canvas/tutorials/presentation.pdf.
Dontcheva et al., v4v: a View for the Viewer, © 2005 AIGA, cover page plus 8 pages; http://research.microsoft.com/~sdrucker/papers/v4v.pdf.
Drucker et al., Comparing and Managing Multiple Versions of Slide Presentations, USIST'06, Oct. 15-18, 2006, © 2005 ACM 1-59593-313-1/06/0010; 10 pages, http://research.microsoft.com/~sdrucker/papers/fp214-DruckerFinalSnriall.pdf.
EP Examination Report in EP Application No. 06759316.0 dated Dec. 28, 2011, 6 pages.
EP Supplemental Search Report in EP Application No. 09803312.9 dated Jul. 7, 2011, 6 pages.
Gallegos et al.; "CounterPoint User Manual" downloaded from archive Org 2005 capture, http://web.archive.org/web/20050205082738/www.cs.umd.edu/hcil/counterpoint/; 21 pages.
GeoTime, accessed at: http://www.geotime.com/Product/GeoTime-(1)/Features---Benefits.aspx; accessed on Jul. 19, 2010, 7 pages.
Good et al.; "CounterPoint: Creating Jazzy Interactive Presentations"—HCIL Tech Report #2001-03, 9 pages.
Grass Roots Software Freepath-Edu Nonlinear Presentation Software, accessed website Aug. 14, 2008,3 pages; http://www.fullcompass.com/product/233150.html.
Hewagamage et al.; Interactive Visualization of Spatiotemporal Patterns Using Spirals on a Geographical Map—accessed at: http://ieeexplore.ieee.org/stamp/stamp.jsp?arnumber=00795916; published 1999, 8 pages.
International Search Report in Application No. PCT/US2006/17725, dated Jul. 5, 2007, 8 pages.
International Search Report in Application No. PCT/US2009/046529 dated Nov. 30, 2009, 11 pages.
International Search Report in Application No. PCT/US2009/051090 dated Jan. 29, 2010, 12 pages.
Izadi et al., "Dynamo: A public interactive surface supporting the cooperative sharing and exchange of media" accessed at: http://hci.stanford.edu/publications/2007/range-wip-final.pdf; published Apr. 2007, 10 pages.
Japanese Notice of Rejection dated Sep. 20, 2013 in Appln No. 2011-523026.
Japanese Office Action Received for Patent Application No. 2011-523026, dated Nov. 5, 2014, 4 Pages.
Kan, Min-Yen, SlideSeer: A Digital Library of Aligned Document and Presentation Pairs, Copyright 2006, 10 pages, http://www.comp.nus.edu.sg/.about.kanmy/papers/jcd12004.pdf.
Keynote '08 User's Guide, Apple Inc. © 2008, 204 pages, http://manuals.info.apple.com/en/Keynote08_UserGuide.pdf.
Little, J. Ambrose; High-End Business Intelligence with Data Visualization for WPF 4, accessed at: http://www.codeproject.com/KB/showcase/DataVisualizationWPF4.aspx; published Jun. 29, 2010, 7 pages.
Microsoft Releases First Beta of "Office 11": Next Version of Office to Connect People, Information and Business Processes, Oct. 2, 2002, 1 page.
Moran et al., "Tailorable Domain Objects as Meeting Tools for an Electronic Whiteboard" accessed at: http://www.fxpal.com/people/chiu/paper-mvc-CSCW98.pdf; published1998, 10 pages.
Moscovich et al., Customizable Presentations, accessed website Aug. 14, 2008, 5 pages; http://www.cs.brown.edu/people/tm/papers/cpresentations.pdf.
Nelson, John; Just Around the Corner: Visual Fusion 4.5, accessed at: http://www.idvsolutions.com/press_newsletter_vfx45_silverlight.aspx; published Sep. 30, 2009, 6 pages.
Office Action dated Aug. 11, 2014, in U.S. Appl. No. 12/184,174, 50 pgs.
Office Action dated Nov. 20, 2012, in U.S. Appl. No. 12/184,174.
Office Action dated Sep. 25, 2013, in U.S. Appl. No. 12/184,174.
Photodex Corporation, ProShow Producer Feature Overview, © 2008, 2 pages; http://www.photodex.com/products/producer/features.html.
PresenterNet.com: "PresenterNet Product Overview"—accessed at URL:http://web.archive.org/web/20050105035936/http://www.presenternet.com/html/products.php; posted Jan. 6, 2005, 3 pages.
U.S. Office Action in U.S. Appl. No. 12/184,174 dated Mar. 13, 2012, 20 pages.
U.S. Appl. No. 13/271,148, filed Oct. 11, 2011 entitled "Interactive Visualization of Multiple Software Functionality Content Items".
U.S. Appl. No. 13/253,839, filed Oct. 5, 2011 entitled "Multi-User and Multi-Device Collaboration".
U.S. Appl. No. 13/253,886, filed Oct. 5, 2011 entitled "Workspace Collaboration Via a Wall-Type Computing Device".
U.S. Appl. No. 13/272,832, filed Oct. 13, 2011 entitled "Authoring of Data Visualizations and Maps".
University of Maryland, CounterPoint: A Zooming Presentation Tool, accessed website Aug. 14, 2008, 2 pages; http://www.cs.umd.edu/hcil/counterpoint.
U.S. Final Office Action in U.S. Appl. No. 12/184,174 dated Sep. 6, 2011, 25 pages.
U.S. Final Office Action in U.S. Appl. No. 12/189,583 dated Mar. 11, 2011, 14 pages.
U.S. Non-Final Office Action in U.S. Appl. No. 12/184,174 dated Feb. 4, 2011, 19 pages.
U.S. Non-Final Office Action in U.S. Appl. No. 12/189,583 dated Sep. 24, 2010, 25 pages.
Visualize and Map SalesForce Leads with SpatialKey—accessed at: http://www.spatialkey.com/support/tutorials/visualize-and-map-salesforce-leads-with-spatialkey-part-ii/; accessed on Jul. 19, 2010, 8 pages.
Welcome to PowerPoint 2007, accessed 2008, 20 pages, http://www.computerbook.nl/pdf/9780470040591.pdf.
Wempen, F., "PowerPoint 2007 Bible"; Feb. 27, 2007, excerpt, 27 pages.
Weverka, "PowerPoint 2007 All-in-One Desk Reference for Dummies"—Wiley Publishing, Jan. 2007, 8 pages.
ZuiPrezi Ltd.; "ZuiPrezi Nonlinear Presentation Editor"; http://zuiprezi.kibu.hu/; 2007; 2 pgs.
Chinese Sixth Office Action Received for Chinese Patent Application No. 200980131157.5, dated Dec. 11, 2014, 9 Pages.
"Japanese Office Action Issued in Japanese Patent Application No. 2011-523026", dated Dec. 22, 2015, 8 Pages.
"Japanese Office Action Issued in Japanese Patent Application No. 2015-039999", dated Jan. 27, 2016, 6 Pages.
Office Action dated Mar. 3, 2016, in U.S. Appl. No. 12/184,174, 27 pgs.
"Office Action Issued in Japanese Patent Application No. 2016-147342", dated Aug. 28, 2017, 7 Pages.
Chilean Office Action dated Oct. 26, 2016, in Application 282-2011, 2 pgs.
Office Action dated Dec. 1, 2016, in U.S. Appl. No. 12/184,174, 26 pgs.

(56) References Cited

OTHER PUBLICATIONS

The Screen Capture Tool by Help and Manual, archived Mar. 13, 2006 by the Internet Wayback Machine, downloaded Nov. 28, 2016 from https://web.archive.org/web/20060313150929/http://www.helpandmanual.com/help/help_toc.html?hm_advanced_tools_capture.htm.
Office Action Issued in European Patent Application No. 09803312.9, dated Feb. 17, 2017, 7 Pages.
Office Action dated Jul. 12, 2017, in U.S. Appl. No. 12/184,174, 18 pgs.
"Search Report Issued in European Patent Application No. 09807033.7", dated Dec. 6, 2017, 9 Pages.
"Adobe Connect", Retrieved From https://en.wikipedia.org/wiki/Adobe_Connect, Sep. 16, 2010, 3 Pages.
"Adobe ConnectNow", Retrieved From https://web.archive.org/web/20101031034349/http://www.adobe.com/acom/connectnow/, Oct. 2010, 10 Pages.
"An Overview of Aabel3 Features", Retrieved From: https://web.archive.org/web/20101112054102/http://www.gigawiz.com/Aabel.html, Jul. 21, 2010, 19 Pages.
"Aquatic Sugar: The Children's Interface, Translated for Adults", Retrieved From http://www.olpcnews.com/software/operating_system/aquatic_sugar_childrens_interface.html, Nov. 7, 2007, 5 Pages.
"Cisco Context-Aware Mobility Solution: Presence Applications", Retrieved From https://web.archive.org/web/20110810211819/http://www.cisco.com/en/US/solutions/collateral/ns340/ns394/ns348/ns788/brochure_c22-497557.html, Sep. 7, 2010, 5 Pages.
"Datapoint—Version 1.1", Retrieved From: http://www.filedudes.com/DataPoint-download-20853.html, May 22, 2005, 2 Pages.
"Description for SharePoint Meeting Manager", Retrieved From http://www.softpicks.net/software/Business/Project-Management/SharePoint-Meeting-Manaaer-47146.htm, Jul. 27, 2009, 2 Pages.
"Free PhotoMesa 3.1.2 (Windows)", Retrieved From https://web.archive.org/web/20071209231951/http://www.windsorinterfaces.com/photomesa.shtml, Dec. 2007, 3 Pages.
"GoToMeeting", Retrieved From https://web.archive.org/web/20101022044223/http://www.gotomeeting.com/fec/online_meeting, 2010, 1 Page.
"Live Meeting", Published in Microsoft Corporation, Jan. 2005, pp. 1-17.
"Meet mimio—The Digital Meeting Assistant", In White Paper, May 1999, 10 Pages.
"Meeting Center Using Video in Your Meetings", Retrieved From https://web.archive.org/web/20130512141342/http://www.oucs.ox.ac.uk/webex/Windows/Video.pdf, May 13, 2009, 2 Pages.
"Meeting Management Software", Retrieved From http://workingsmarter.typepad.com/my_weblog/2004/12/meeting_managem.html, Dec. 10, 2004, 2 Pages.
"Microsoft Office Communicator 2007 Gelling Started Guide", Retrieved From http://www.ecu.edu/itcs/services/customcf/documents/communicator/Communicator2007-GettingStarted.pdf, Jul. 2007, 77 Pages.
"Mindshift Innovation", Retrieved From http://mindshiftinnovation.blogspot.com/2007/09/seadragon.html, Oct. 4, 2007, 2 Pages.
"Online Calendar & Group Scheduling", In MOSAIC Technologies, Retrieved on Apr. 24, 2009, 4 Pages.
"Final Office Action Issued in U.S. Appl. No. 11/260,515", dated Dec. 11, 2009, 19 Pages.
"Final Office Action Issued in U.S. Appl. No. 11/260,515", dated Feb. 24, 2011, 15 Pages.
"Non-Final Office Action Issued in U.S. Appl. No. 11/260,515", dated Sep. 30, 2010, 18 Pages.
"Non-Final Office Action Issued in U.S. Appl. No. 11/260,515", dated Mar. 3, 2009, 16 Pages.
"Final Office Action Issued in U.S. Appl. No. 12/472,101", dated Mar. 28, 2012, 20 Pages.
"Non-Final Office Action Issued in U.S. Appl. No. 12/472,101", dated Oct. 5, 2011, 16 Pages.
"Final Office Action Issued in U.S. Appl. No. 12/965,965", dated Nov. 8, 2012, 12 Pages.
"Non-Final Office Action Issued in U.S. Appl. No. 12/965,965", dated Dec. 20, 2013, 16 Pages.
"Non-Final Office Action Issued in U.S. Appl. No. 12/965,965", dated Jun. 4, 2012, 12 Pages.
"Final Office Action Issued in U.S. Appl. No. 12/968,332", dated Aug. 1, 2013, 19 Pages.
"Non-Final Office Action Issued in U.S. Appl. No. 12/968,332", dated Jul. 23, 2012, 19 Pages.
"Office Action Issued in U.S. Appl. No. 12/968,332", dated Dec. 5, 2013, 20 Pages.
"Non-Final Office Action Issued in U.S. Appl. No. 13/253,886", dated Apr. 11, 2013, 13 Pages.
"Final Office Action Issued in U.S. Appl. No. 13/272,832", dated Dec. 30, 2013, 18 Pages.
"Non-Final Office Action Issued in U.S. Appl. No. 13/272,832", dated Aug. 12, 2013, 16 Pages.
"Office Action Issued in Japanese Patent Application No. 2011-523026", dated Mar. 7, 2014, 4 Pages.
"Office Action Issued in Japanese Patent Application No. 2016-147342", dated Apr. 24, 2018, 6 Pages.
"First Office Action Issued in Indian Patent Application No. 690/CHENP/2011", dated May 30, 2018, 7 Pages.
Adams, et al., "Distributed Research Teams: Meeting Asynchronously in Virtual Space", In Journal of Computer Mediated Communication, vol. 4, Issue 4, Jun. 1, 1999, 17 Pages.
Bell, et al., "Sensory Semantic User Interfaces (SenSUI) (position paper)", In Proceedings of the 2nd International Conference on Semantic Sensor Networks, vol. 522, Oct. 20, 2009, 14 Pages.
Bunzel, Tom, "Using Quindi Meeting Capture", Retrieved From http://www.informit.com/articles/article.aspx?p=170392&seqNum=220, Sep. 1, 2006, 3 Pages.
Derthick, et al., "An Interactive Visualization Environment for Data Exploration", In Proceedings of Knowledge Discovery in Databases, Aug. 1997, 10 Pages.
Fernando, et al., "Narrowcasting Attributes for Presence Awareness in Collaborative Virtual Environments", In the Sixth IEEE International Conference on Computer and Information Technology, Sep. 2006, 6 Pages.
Fruchter, Renate, "Brick & Bits & Interaction (BBI)", Retrieved From http://pbl.stanford.edu/Research/ResearchIW.html, 2001, 4 Pages.
Geyer, et al., "Activity Explorer: Activity-centric Collaboration from Research to Product", In Proceedings of IBM Systems Journal, vol. 45, Issue: 4, 2006, 23 Pages.
Greenberg, et al., "Human and Technical Factors of distributed Group Drawing Tools", In Interacting with Computers, vol. 4, Issue 3, Dec. 1, 1992, pp. 364-392.
Hupfer, et al., "Introducing Collaboration into an Application Development Environment", In Proceedings of the ACM Conference on Computer Supported Cooperative Work, Nov. 6, 2004, 4 Pages.
Ionescu, et al., "Workspace Navigator: Tools for Capture, Recall and Reuse using Spatial Cues in an Interactive Workspace", In Stanford Technical Report, TR2002-04, 2002, 16 Pages.
Ju, et al., "Where the Wild Things Work: Capturing Shared Physical Design Workspaces", In Proceedings of the ACM Conference on Computer Supported Cooperative Work, Nov. 6, 2004, pp. 533-541.
Kang, et al., "Effects of Lateral Charge Spreading on the Reliability of TANOS (TaN/AlO/SiN/Oxide/Si) NAND Flash Memo", IEEE 45th Annual International Reliability Physics Conference, Jan. 2007, 4 Pages.
Karlson, et al., "Courier: A Collaborative Phone-Based File Exchange System", In Proceedings of TechReport, Jan. 1, 2008, 17 Pages.
Kim, et al., "CMPT 481/811—SmartMeeting: Automatic Meeting Recording System", Retrieved From http://www.cs.usask.ca/grads/hyk564/homePage/811/CMPT%20811%20final.doc, 2004, 7 Pages.
Lai, et al., "Fluorinated ALD Al2O3 Gate Dielectrics by CF4 Plasma", In Proceedings of 2005 International Semiconductor Device Research Symposium, Dec. 7, 2005, 2 Pages.
Lai, et al., "Study of the Erase Mechanism of MANOS (Metal/Al2O3/SiN/SiO2/Si) Device", In IEEE Electron Device Letters, vol. 28, Issue 7, Jul. 2007, 3 Pages.

(56) References Cited

OTHER PUBLICATIONS

Lee, et al., "A Novel SONOS Structure of Si02/SiN/Al2O3 with TaN Metal Gate for Multi-Giga Bit Flash Memories", In International Electron Devices Meeting, Dec. 8, 2003, 4 Pages.
Lu, et al., "Non-Volatile Memory Technology—Today and Tomorrow", In Proceedings of the 13th Physical and Failure Analysis of Integrated Circuits, Jul. 3, 2006, 6 Pages.
Mitrovic, et al., "Adaptive User Interface for Mobile Devices", In International Workshop on Design, Specification, and Verification of Interactive Systems, Jun. 12, 2002, 15 Pages.
Peddemors, et al., "Presence, location and Instant Messaging in a Context-Aware Application Framework", In the 4th International Conference on Mobile Data Management (MDM2003), Dec. 16, 2002, 6 Pages.
Piekarski, et al., "Through-Walls Collaboration", In IEEE Pervasive Computing, vol. 8, Issue 3, Jul. 17, 2009, 8 Pages.
Rudnicky, et al., "Intelligently Integrating Information from Speech and Vision to Perform Light-weight Meeting Understanding", In International Workshop on Multimodal Multiparty Meeting Processing, Oct. 2005, pp. 79-84.
Shaw, Glenna R., "Create Pan and Zoom Effects in PowerPoint", Retrieved From: https://support.office.com/en-us/article/create-pan-and-zoom-effects-in-powerpoint-689715d0-6787-4d40-9872-99d5b3087946, 2007, 10 Pages.
Watson, Richard, "What is Mobile Presence?", Retrieved From: http://technews.tmcnet.com/reseller/topics/unified-communications/articles/54033-what-mobile-presence.htm, Apr. 10, 2009, 4 Pages.
Werle, et al., "Active Documents Supporting Teamwork in a Ubiquitous Computing Environment", In PCC Workshop, 2001, 4 Pages.
Yu, et al., "Who Said What When? Capturing Important Moments of a Meeting", In CHI'10 Extended Abstracts on Human Factors in Computing Systems, Apr. 10, 2010, 7 Pages.
Zenghong, et al., "Context Awareness and Modeling in Self-Adaptive Geo-Information Visualization", Retrieved From https://icaci.org/files/documents/ICC_proceedings/ICC2009/html/nonref/17_1.pdf, Aug. 30, 2010, 13 Pages.
Wen, Xin, "Microsoft.NET Strategy-All-Out MSN Approaches (Part I), MSN Explorer, A Beautiful Butterfly that Flies into the Window", In Publication of China Academic Journal Electronic Publishing House, Jan. 1994, pp. 49-52.
Wen, Xin, "Microsoft.NET Strategy-All-out MSN Approaches (Part II), Smoke of Gunpowder Rises Again in MSN Messenger Instant Messaging Market", In Publication of the China Academic Journal Electronic Publishing House, Jan. 1994, pp. 49-52.
"Full Analysis of New Face, Notes/Domino R5.05 Sametime 2.0", In Notes Domino Magazine of Softbank Publishing Inc., vol. 12, Issue 50, Dec. 1, 2000, pp. 73-82.
"Ketchum Portal Uses Plumtree, eRoom Technology to Collaborate With Staff, Clients", In Publication of I/S Analyzer Case Studies, United Communications Group, vol. 40, Issue 1, Jan. 2001, pp. 7-10.
"Lotus Notes (R5) Client—Calendaring, Personal Calendar", Retrieved From: http://web.archive.org/web/20011102175413/http://www.rhsmith.umd.edu/tr/LNR5Cal.htm, Retrieved Date: Nov. 2, 2001, 7 Pages.
"Screen Shots", In Lotus Notes 6, Screenshots of Release 6.02 CFI, Mail, Calendar interface, Jun. 9, 2003, 5 Pages.
"Screen Shots of Microsoft Outlook", Jan. 1999, 3 Pages.
"Windows NetMeeting", Retrieved From: http://web.archive.org/web/20030421050139/http://publish.edu.uwo.ca/rick.kitto/resource_files/Housekeeping/Netmeeting.PDF, Apr. 21, 2003, 11 Pages.
"Office Action Issued in European Patent Application No. 04013149.2", dated May 30, 2005, 3 Pages.
"Office Action Issued in European Patent Application No. 06101313.2", dated Apr. 17, 2007, 1 Page.
"Office Action Issued in European Patent Application No. 06110218.2", dated Dec. 13, 2007, 3 Pages.
"Office Action Issued in European Patent Application No. 06110218.2", dated Jul. 15, 2010, 4 Pages.
"Office Action Issued in European Patent Application No. 06110218.2", dated Sep. 13, 2011, 4 Pages.
"Office Action Issued in European Patent Application No. 06110218.2", dated Jul. 16, 2013, 3 Pages.
"Office Action Issued in European Patent Application No. 06110218.2", dated Mar. 12, 2007, 4 Pages.
"Office Action Issued in European Patent Application No. 06110218.2", dated Dec. 17, 2008, 5 Pages.
"Search Report Issued in European Patent Application No. 06110218.2", dated Jul. 24, 2006, 7 Pages.
"Office Action Issued in European Patent Application No. 09807033.7", dated Nov. 16, 2018, 7 Pages.
"Final Office Action Issued in U.S. Appl. No. 10/607,780", dated Feb. 7, 2008, 15 Pages.
"Non Final Office Action Issued in U.S. Appl. No. 10/607,780", dated Jun. 18, 2007, 14 Pages.
"Final Office Action Issued in Japanese Patent Application No. 2011-523026", dated Nov. 5, 2014, 4 Pages.
"Non Final Office Action Issued in U.S. Appl. No. 11/073,404", dated Oct. 2, 2008, 8 Pages.
"Final Office Action Issued in U.S. Appl. No. 11/074,885", dated Jun. 23, 2009, 14 Pages.
"Non Final Office Action Issued in U.S. Appl. No. 11/074,885", dated May 2, 2008, 8 Pages.
"Non Final Office Action Issued in U.S. Appl. No. 11/074,885", dated Nov. 28, 2008, 15 Pages.
"Final Office Action Issued in U.S. Appl. No. 11/074,972", dated Dec. 24, 2008, 18 Pages.
"Non Final Office Action Issued in U.S. Appl. No. 11/074,972", dated Jul. 8, 2009, 22 Pages.
"Non Final Office Action Issued in U.S. Appl. No. 11/074,972", dated Jun. 10, 2008, 15 Pages.
"Final Office Action Issued in U.S. Appl. No. 11/166,771", dated Sep. 11, 2008, 23 Pages.
"Non Final Office Action Issued in U.S. Appl. No. 11/166,771", dated Jan. 29, 2008, 17 Pages.
"Non Final Office Action Issued in U.S. Appl. No. 11/166,910", dated Mar. 26, 2008, 15 Pages.
"Final Office Action Issued in U.S. Appl. No. 11/167,065", dated Dec. 27, 2007, 10 Pages.
"Non Final Office Action Issued in U.S. Appl. No. 11/167,065", dated Sep. 22, 2008, 10 Pages.
"Non Final Office Action Issued in U.S. Appl. No. 11/167,065", dated Jul. 2, 2007, 10 Pages.
"Non Final Office Action Issued in U.S. Appl. No. 12/472,101", dated Sep. 16, 2014, 10 Pages.
"Final Office Action Issued in U.S. Appl. No. 12/558,507", dated Jun. 3, 2015, 20 Pages.
"Final Office Action Issued in U.S. Appl. No. 12/558,507", dated Feb. 28, 2014, 17 Pages.
"Final Office Action Issued in U.S. Appl. No. 12/558,507", dated Oct. 2, 2012, 17 Pages.
"Final Office Action Issued in U.S. Appl. No. 12/558,507", dated Jul. 14, 2016, 18 Pages.
"Final Office Action Issued in U.S. Appl. No. 12/558,507", dated Dec. 15, 2017, 20 Pages.
"Final Office Action Issued in U.S. Appl. No. 12/558,507", dated Nov. 2, 2018, 20 Pages.
"Non Final Office Action Issued in U.S. Appl. No. 12/558,507", dated Dec. 23, 2015, 17 Pages.
"Non Final Office Action Issued in U.S. Appl. No. 12/558,507", dated Nov. 6, 2014, 18 Pages.
"Non Final Office Action Issued in U.S. Appl. No. 12/558,507", dated May 8, 2012, 14 Pages.
"Non Final Office Action Issued in U.S. Appl. No. 12/558,507", dated Aug. 21, 2013, 14 Pages.
"Non Final Office Action Issued in U.S. Appl. No. 12/558,507", dated Jun. 28, 2018, 21 Pages.
"Non Final Office Action Issued in U.S. Appl. No. 12/558,507", dated Feb. 24, 2017, 18 Pages.
"Final Office Action Issued in U.S. Appl. No. 12/965,965", dated Jun. 5, 2014, 13 Pages.

(56) References Cited

OTHER PUBLICATIONS

"Final Office Action Issued in U.S. Appl. No. 12/965,965", dated Mar. 11, 2015, 17 Pages.
"Non Final Office Action Issued in U.S. Appl. No. 12/965,965", dated Oct. 2, 2014, 14 Pages.
"Final Office Action Issued in U.S. Appl. No. 12/968,332", dated Jul. 17, 2014, 23 Pages.
"Non Final Office Action Issued in U.S. Appl. No. 12/968,332", dated Oct. 9, 2014, 23 Pages.
"Non Final Office Action Issued in U.S. Appl. No. 13/253,886", dated Aug. 14, 2014, 15 Pages.
"Final Office Action Issued in U.S. Appl. No. 13/271,148", dated Jul. 17, 2015, 18 Pages.
"Non Final Office Action Issued in U.S. Appl. No. 13/271,148", dated Dec. 4, 2014, 31 Pages.
"Final Office Action Issued in U.S. Appl. No. 13/272,832", dated Apr. 20, 2015, 66 Pages.
"Non Final Office Action Issued in U.S. Appl. No. 13/272,832", dated Oct. 31, 2014, 17 Pages.
"Non Final Office Action Issued in U.S. Appl. No. 14/225,234", dated Jun. 17, 2016, 11 Pages.
"Non Final Office Action Issued in U.S. Appl. No. 14/225,234", dated Jul. 18, 2014, 5 Pages.
"First Office Action Issued in Chinese Patent Application No. 200410069436.2", dated Jun. 8, 2007, 15 Pages.
"Second Office Action Issued in Chinese Patent Application No. 200410069436.2", dated Oct. 17, 2008, 12 Pages.
"Third Office Action Issued in Chinese Patent Application No. 200410069436.2", dated Apr. 10, 2009, 10 Pages.
"Office Action Issued in Japanese Patent Application No. 2004-190395", dated Jun. 15, 2010, 8 Pages.
"Office Action Issued in Japanese Patent Application No. 2006-030252", dated Aug. 9, 2011, 11 Pages.
"First Office Action Issued in Chinese Patent Application No. 200610003730.2", dated Sep. 18, 2009, 17 Pages.
"Second Office Action Issued in Chinese Patent Application No. 200610003730.2", dated Jun. 28, 2010, 7 Pages.
"Third Office Action Issued in Chinese Application No. 200610003730.2", dated Oct. 27, 2010, 7 Pages.
"Office Action Issued in Russian Patent Application No. 2011103151", dated May 31, 2013, 5 Pages.
"First Office Action and Search Report Issued in Chinese Patent Application No. 201210376181.9", dated Nov. 2, 2014, 16 Pages.
"Office Action Issued in Indian Patent Application No. 261/DEL/2006", dated Mar. 31, 2015, 2 Pages.
"Office Action Issued in Indian Patent Application No. 75/CHENP/2011", dated Jun. 27, 2018, 6 Pages.
"Office Action Issued in Indian Patent Application No. 998/DEL/2004", dated May 12, 2015, 2 Pages.
Anderson, Ron, "Far-Flung Firms Will Find ERoom's Workspace a Comfortable Place to Meet", In Network Computing, vol. 12, Issue 2, Jan. 22, 2001, pp. 34-36.
Callas, Jon, "Identity-Based Encryption with Conventional Public-Key Infrastructure", Retrieved From: https://web.archive.org/web/20051218070552/http://middleware.internet2.edu/pki05/proceedings/callas-conventional_ibe.pdf, Feb. 18, 2005, 14 Pages.
Curran, Kevin, "Peer-to-Peer Networking Collaboration Within Education", In Journal of Educational Multimedia and Hypermedia, vol. 11, Issue 1, Nov. 2002, pp. 21-30.
Darrow, Barbara, "Web Services Key to Groove 2.5", In Publication of CRN, Issue 1018, Oct. 28, 2002, pp. 7-10.
Ewalt, David M., "A New Way of Collaborating-Business Processes", In Publication of the Information Week, Issue 916, Nov. 25, 2002, pp. 46-48.
Freed, Judy, "Using Microsoft Outlook A Beginner's Guide Email and Calendars", In Publication of University of North Carolina at Charlotte, Sep. 19, 2002, 22 Pages.
Hiroki, Ito, "Sharing Information and Schedule Without Using a Server, Fully Using P2P Groupware", In Internet Magazine, Issue 92, Sep. 1, 2002, pp. 132-148.
Jern, et al., "Visual Data Navigators—Collaboratories", In Proceedings of the 1st International Symposium on 3D Data Processing Visualization and Transmission, Jun. 19, 2002, pp. 66-69.
Marsic, Ivan, "Data-Centric Collaboration for Wired and Wireless Platforms", In Journal of Computing and Information Technology, vol. 10, Issue 3, Sep. 2002, pp. 151-156.
Menezes, et al., "Identification and Entity Authentication", In Handbook of Applied Cryptography by CRC Press, Dec. 31, 1997, pp. 385-424.
Takehisa, et al., "Development of APEX Office Application", In Proceedings of NEC Research and Development, vol. 43, Issue 4, Oct. 2002, pp. 295-299.
Zha, et al., "Web-Based Collaborative Framework and Environment for Designing and Building Robotic Systems", In Proceedings of the IEEE International Conference on Robotics and Automation, vol. 2, May 11, 2002, pp. 2196-2201.
Zhang, et al., "Anonymous Public-Key Certificates for Anonymous and Fair Document Exchange", In Proceedings of the IEEE Communications, vol. 147, Issue 6, Dec. 11, 2000, pp. 345-350.
"Non Final Office Action Issued in U.S. Appl. No. 12/558,507", dated Apr. 19, 2019, 17 Pages.

\* cited by examiner

SECTIONS OF A PRESENTATION HAVING USER-DEFINABLE PROPERTIES

CROSS REFERENCE TO RELATED APPLICATIONS

This application is a continuation of application Ser. No. 13/361,009, filed Jan. 30, 2012, and assigned U.S. Pat. No. 8,954,857, which is a continuation of application Ser. No. 12/189,583, filed Aug. 11, 2008, and now U.S. Pat. No. 8,108,777, the disclosures of which are incorporated by reference herein in their entirety.

BACKGROUND

Electronic presentations are used in a variety of contexts for conveying information. For example, a businessperson may use an electronic slide presentation to convey information about business performance. In another example, a teacher may use an electronic slide presentation to teach a lesson.

Presentation applications executing on personal computers are used to author and present electronic presentations. A typical presentation application presents an authoring interface that enables a user to edit slides in a presentation. The authoring interface may include a primary pane and a navigation pane. The primary pane contains an editable slide in the presentation. The navigation pane may include a series of thumbnail images of each slide in the presentation. A thumbnail image of a slide is a smaller version of the slide. A user of the presentation application can click on a thumbnail image of a slide to cause the primary pane of the authoring interface to display the slide for editing.

Electronic slide presentations may include a large number of slides and may contain information about several topics. For example, a physics teacher may use an electronic slide presentation to teach a lesson that includes slides about resistance, slides about capacitance, and slides about an upcoming exam.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In general, this disclosure describes techniques that employ user-defined values of properties of sections of an electronic presentation. As described herein, a user may configure a presentation to include a plurality of sections. Each of the sections includes zero or more slides of the electronic slide presentation. In addition to the slides associated with each section, each of the sections is associated with one or more properties having values that can be defined by an author of the presentation. Because the values of the properties of the sections are user-definable, these properties may, in some implementations of these techniques, enable the author of the presentation to use the sections in ways not possible in presentation applications that merely use sections as a means of grouping thumbnail images of slides for easy navigation among slides in an authoring interface.

As described below, the properties of a section may include, for example, a title of the section, a name of an author of the section, a set of access control data that specifies rights of users to perform actions with respect to the section, and other properties. The properties of sections may be used during authoring of the presentation or during presentation of the presentation. The uses of such properties during authoring of a presentation may include, for example, the ability to conceal or reveal thumbnail images of slides in a section by clicking on a title of the section, the ability to reorder sections using titles of the sections, the ability to use the name of a section to print the slides in the section, the ability to create a hyperlink to a section of a presentation, the ability to associate searchable keywords with sections, and other uses. The uses of such properties during presentation of the presentation may, for example, include the ability to view names of sections of a presentation during presentation of the presentation and navigating to a first slide in a section.

DETAILED DESCRIPTION

In general, this disclosure describes techniques that employ user-defined values of properties of sections of an electronic presentation. In the following description, various examples are described. It should be appreciated that these examples are provided for purposes of explanation and not as express or implied limitations on the scopes of the claims.

Figure 1:
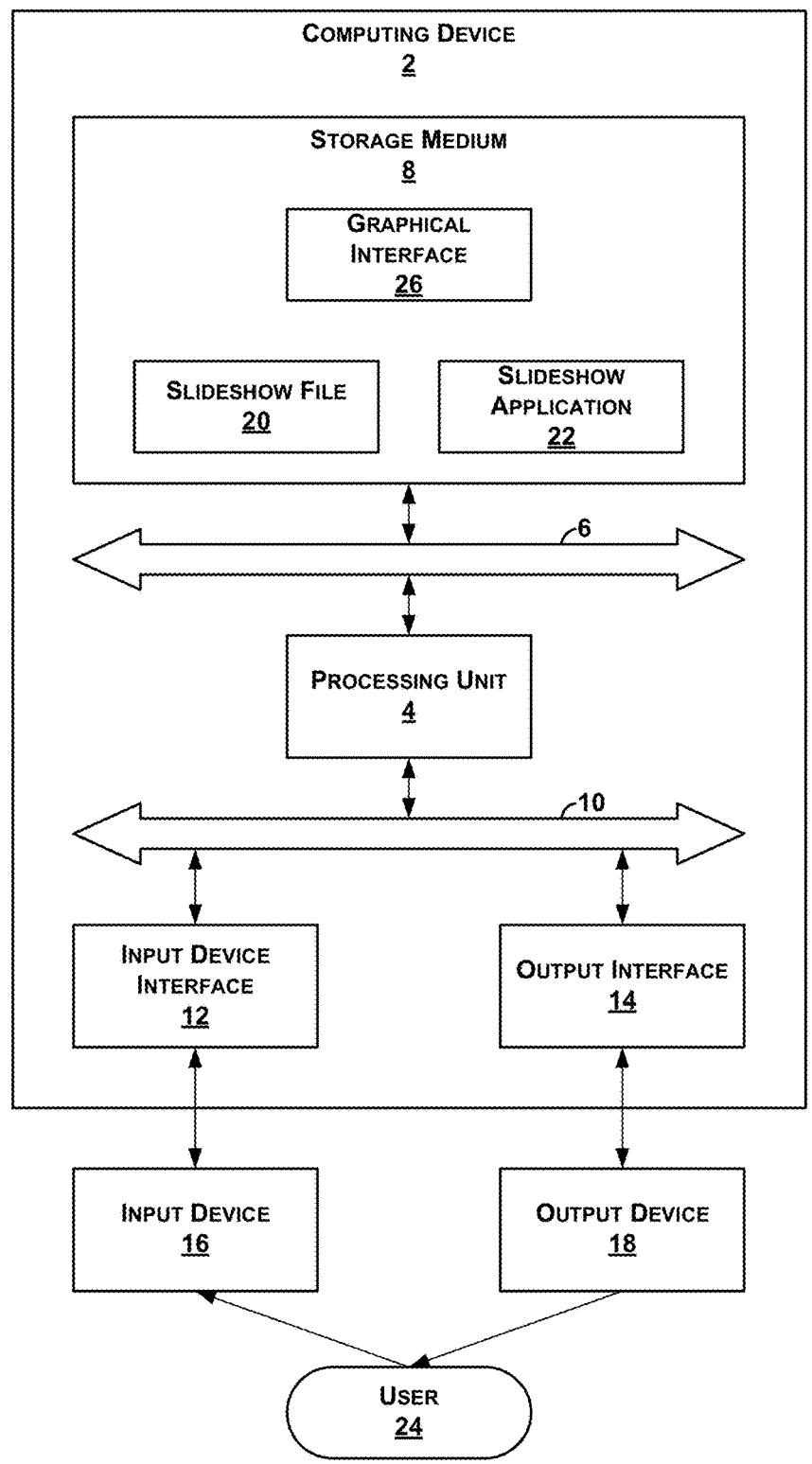
FIG. 1 illustrates an example computing device.

FIG. 1 illustrates an example computing device 2. Computing device 2 may be a wide variety of different types of physical computing devices. For example, computing device 2 may be a personal computer, a laptop computer, a tablet computer, a server computer, a mainframe computer, a mobile telephone, a network telephone, a television set top box, a personal media player, or another type of computing device. Furthermore, computing device 2 may implemented as two or more physically separate "boxes." For example, computing device 2 may be a cluster of two or more physical computing devices. In another example, computing device 2 may be a grid computing system.

As illustrated in the example of FIG. 1, computing device 2 comprises a processing unit 4 that is capable of executing instructions. Processing unit 4 may be implemented as a set of integrated circuits that includes at least one integrated circuit. In one example implementation, processing unit 4 is a Core 2 processor manufactured by Intel Corporation of Santa Clara, Calif. In other example implementations, processing unit 4 is implemented as a plurality of integrated circuits distributed among several physical devices.

The example of FIG. 1 also illustrates that computing device 2 comprises a communication link 6 that enables processing unit 4 to communicate with a storage medium 8. Communication link 6 may be a variety of different types of communications link, including a front-side bus, a HyperTransport link, an Intel QuickPath Interconnect, an Accelerated Graphics Port bus, a computer network link (e.g., one or more Ethernet links, fiber optic links, etc.), a PCI link, or another type of link.

Storage medium 8 is capable of storing instructions that are readable and executable by processing unit 4. Storage medium 8 may be a wide variety of different types of computer-readable storage media. For example, storage medium 8 may be implemented as one or more random access memory units, one or more read-only memory units, magnetic disks, optical disks, magnetic tapes, flash memory units, or other types of storage media. It should be appreciated that the term "storage medium" refers to a collection of one or more storage media units or one or more types of storage media. For instance, some data in storage medium 8 may be physically stored on a magnetic tape and some data in storage medium 8 may be physically stored on a magnetic disk.

In the example of FIG. 1, computing device 2 includes a communication link 10 that enables processing unit 4 to communicate with an input device interface 12 and an output device interface 14. Communication link 10 may be a variety of different types of communications link, including a front-side bus, a HyperTransport link, an Intel QuickPath Interconnect, an Accelerated Graphics Port bus, a computer network link (e.g., one or more Ethernet links, fiber optic links, etc.), a PCI link, or another type of link. Input device interface 10 facilitates communication from an input device 16. Output device interface 14 facilitates communication with an output device 18 that is capable of outputting information to the real world. Input device interface 12 and output device interface 14 may be implemented in a variety of ways. For instance, input device interface 12 and/or output device interface 14 may be implemented as a Universal Serial Bus (USB) interface card, a serial bus card, a network interface (e.g., an Ethernet card, a WiFi adapter, a WiMax adapter, etc.) or another type of physical input device interface. In some instances, the functionality of input device interface 10 and the functionality of output device interface 12 may be implemented by a single physical card.

Input device 16 may be wide variety of different types of devices. For example, input device 16 may be a mouse, a trackball, a touch-sensitive screen, a keyboard, a keypad, or another type of input device.

Output device 18 may also be a wide variety of different types of devices. For example, output device 18 may be a visual display unit such as a cathode ray display screen, a liquid crystal display (LCD) screen, a light-emitting diode (LED) array, a plasma screen, or another type of device that is capable of outputting information to the real world. Processing unit 4 may present information on output device 18 in a variety of ways. For example, processing unit 4 and output device interface 14 may be connected to a motherboard of computing device 2. In this example, a digital visual interface cable, or another type of physical video connector cable, may connect the output device interface 14 and output device 18. In this example, processing unit 4 may send instructions regarding an image to output device interface 14 and output device interface 14 may send signals to output device 18 to display the image. In another example, processing unit 4 may present information on output device 18 by transmitting information over a network to a computing device that causes output device 18 to display an image based on the transmitted information.

Storage medium 8 stores a presentation file 20 that represents an electronic presentation. Presentation file 20 contains at least one set of section data. Each set of section data in presentation file 20 defines a section. A "section" is a logical unit of an electronic presentation that has at least one property having a user-definable value and that is associated with zero or more sequential or non-sequential slides of the presentation. Each set of section data identifies a set of slides associated with a section and a user-defined value of a property of the section other than the set of slides included in the section. As discussed below, the property of the section may be a variety of different properties and that a set of section data may include several user-defined values of properties of a section. For example, a first set of section data may contain data that directly represents six slides included in a first section and may contain data that indicates that the name of the first section is "Section 1." Further, in this example, a second set of section data in presentation file 20 may contain data that directly represents four slides and may contain data that indicates that the name of the second section is "Section 2." In this example, the first section may include slides 1, 3, 5, 6, 7, and 9 and the second section may include slides 2, 4, 8, and 10.

Presentation file 20 may include a wide variety of different types of data structures that embody the sets of section data. For example, presentation file 20 may include an extensible markup language (XML) data structure for each set of section data. In another example, presentation file 20 may include binary data structures that represent each set of section data. In another example, presentation file 20 may include a set of section data that identifies the first set of slides and identifies the data that specifies the user-defined value of the property of the first section by specifying a link to a third set of section data contained in a second presentation file. In this example, the third set of section data identifies the first set of slides and identifies data that specifies the user-defined value of the property of the first section by containing data that directly represents the first set of slides and by containing data that directly represents the user-defined value of the property of the first presentation.

In addition to presentation file 20, storage medium 8 stores a presentation application 22. Presentation application 22 may be similar in some respects to presentation applications such as the Microsoft POWERPOINT® presentation graphics program sold by Microsoft Corporation of Redmond, Wash., the KEYNOTE® slide presentation software sold by Apple Corporation of Cupertino, Calif., the OpenOffice Impress slide presentation software provided by OpenOffice.org, and the GOOGLE APPS® slide presentation application provided by Google, Inc. of Mountain View, Calif.

In one example implementation, presentation application 22 comprises a set of instructions that are executable by processing unit 4. When a user 24 wants to interact with the electronic presentation represented by presentation file 20, user 24 may use input device 16 to instruct computing device 2 to begin executing the instructions of presentation application 22. For example, user 24 may instruct computing device 2 to begin executing instructions of presentation application 22 by using a mouse to select an icon displayed on output device 18 that represents presentation application 22. In another example, user 24 may instruct computing device 2 to begin executing instructions of presentation application 22 by using a keyboard to select an icon representing presentation file 20.

When processing unit 4 begins executing the instructions of presentation application 22, the instructions cause processing unit 4 to access presentation file 20. Upon accessing presentation file 20, the instructions of presentation application 22 cause processing unit 4 to generate a graphical interface 26 in storage medium 8. When processing unit 4 generates graphical interface 26, processing unit 4 uses the values of the properties of the sections of the presentation. Graphical interface 26, when displayed on output device 18 enables a user 24 to interact with an electronic presentation that includes the slides in each of the sections defined by the sets of section data included in presentation file 20. After causing processing unit 4 to generate graphical interface 26, the instructions of presentation application 22 cause processing unit 4 to display graphical interface 26 on output device 18.

Figure 2:
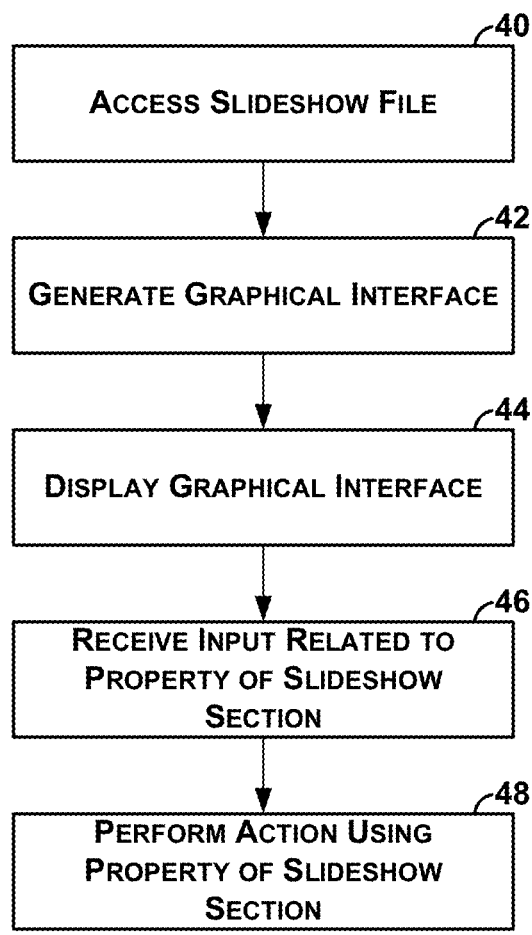
FIG. 2 illustrates an example operation that instructions of a presentation application may cause a processing unit of the computing device to perform.

FIG. 2 illustrates a first example operation that instructions of presentation application 22 may cause processing unit 4 of computing device 2 to perform. When processing unit 4 begins executing the instructions of presentation application 22, the instructions cause processing unit 4 to access presentation file 20 (40). In other words, the instructions cause processing unit 4 to retrieve some or all of presentation file 20 from storage medium 8. As described above, presentation file 20 contains at least one set of section data. Each set of section data identifies a set of zero or more slides included in a section and a user-defined value of a property of the section other than the set of slides included in the section. For example, presentation file 20 may contain: (i) a first set of section data that defines a first section, the first set of section data identifying a first set of slides and identifying data that specifies a user-defined value of a property of the first section other than the first set of slides, and (ii) a second set of section data that defines a second section, the second set of section data identifying a second set of slides and identifying data that specifies a user-defined value of a property of the second section other than the second set of slides.

After the instructions of presentation application 22 cause processing unit 4 to access presentation file 20, the instructions of presentation application 22 cause processing unit 4 to generate graphical interface 26 using at least one user-defined value of a property of one of the sections (42). Continuing the example cited in the previous paragraph, the instructions of presentation application 22 may cause processing unit 4 to generate graphical interface 26 using the value of property of the first section and the value of the property of the second section. Once processing unit 4 generates graphical interface 26, the instructions of presentation application 22 cause processing unit 4 to display graphical interface 26 on output device 18 (44).

As mentioned above, graphical interface 26 is designed to enable user 24 to interact with a presentation that includes slides in the sections contained in presentation file 20. Accordingly, when output device 18 displays graphical interface 26, the instructions of presentation application 22 enable processing unit 4 to receive input related to a property of a section in the presentation (46). For example, the instructions of presentation application 22 may enable processing unit 4 to receive mouse movement and mouse click input. In response to the input, the instructions of presentation application 22 cause processing unit 4 to perform an action using the property of the section (48).

The instructions of presentation application 22 may cause processing unit 4 to generate graphical interface 26 in a wide variety of ways, thereby enabling a wide variety of possible ways that user 24 can interact with the presentation. Furthermore, because the instructions of presentation application 22 may cause processing unit 4 to generate graphical interface 26 in a wide variety of ways, processing unit 4 may be receive a wide variety of inputs in step 46 and may perform a wide variety of actions in response to these inputs in step 48. Some of the potential ways of generating graphical interface 26 to enable specific types of interaction are summarized with reference to FIGS. 3-8.

Figure 3:
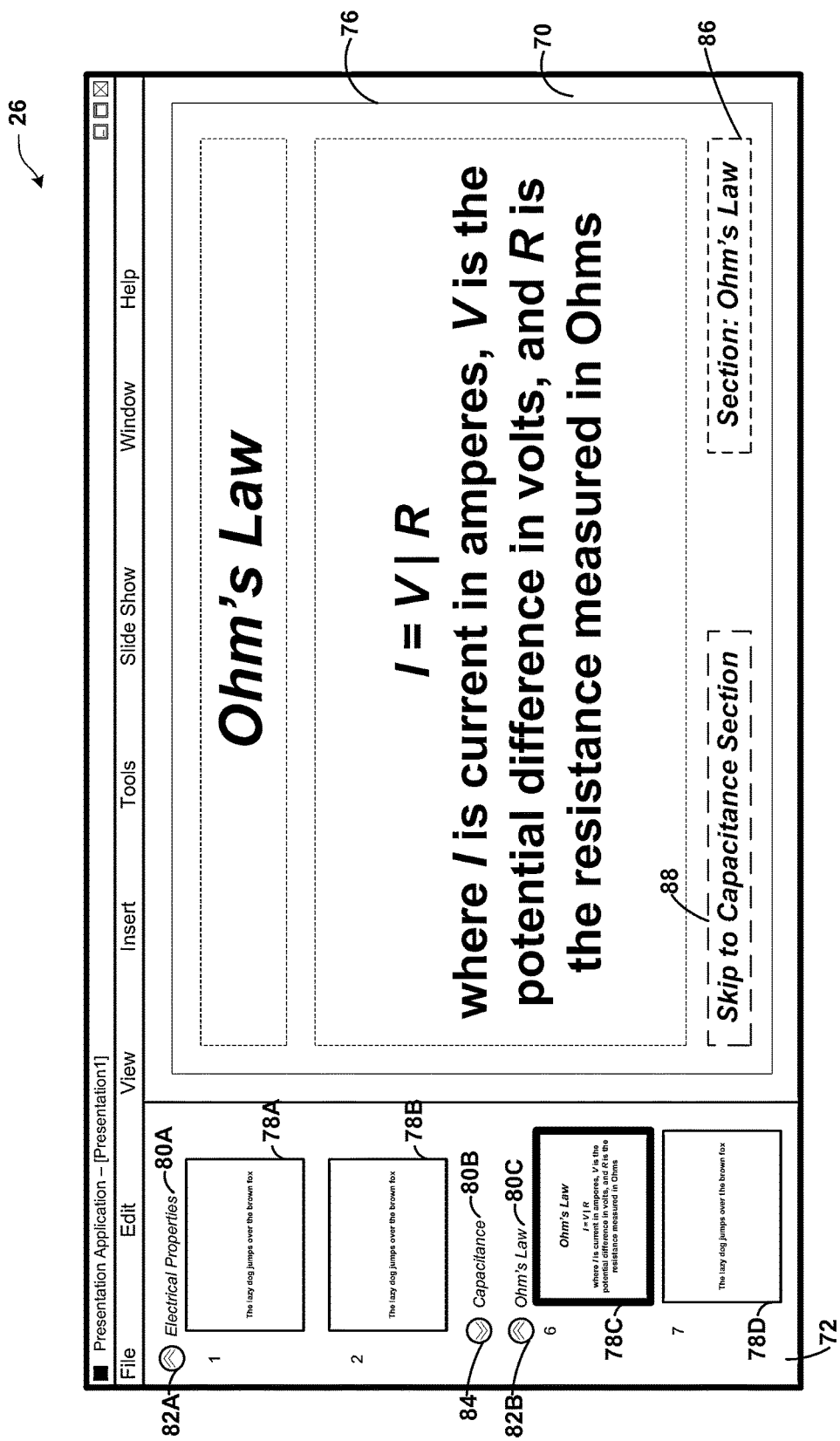
FIG. 3 illustrates an example graphical interface generated by the presentation application for authoring a presentation.

In a first example, presentation file 20 includes sets of section data that contain user-defined values of title properties of the sections of the presentation. Referring to FIG. 3, the instructions of presentation application 22 cause processing unit 4 to generate graphical interface 26 such that graphical interface 26 includes a primary pane 70 and a navigation pane 72. Primary pane 70 contains an editable slide 76 in the presentation. Navigation pane 72 includes a series of thumbnail images 78A through 78D (collectively, "thumbnail images 78") of slides in the presentation. In addition to thumbnail images 78, navigation pane 72 includes the values of the title properties 80A-80C (collectively, "titles 80") of the sections of the presentation. Thumbnail images of slides within a section are shown below the value of the title property of the section. For instance, in the example of FIG. 3, thumbnail images 78A and 78B are shown below the title "Electrical Properties" indicating that the slides represented by thumbnail images 78A and 78B are within a section having the title property "Electrical Properties." Similarly, thumbnail images 78C and 78D are shown below the title "Ohm's Law" indicating that the slides represented by thumbnail images 78C and 78D are within the section having the title property "Ohm's Law."

The example interface in FIG. 3 also illustrates that a first section may be a child section of a second section. When a first section is a child section of a second section, all slides in the first section are slides in the second section, but all slides in the second section are not necessarily slides in the first section. In the example of FIG. 3, the section having the title property "Ohm's Law" is a child section of the section having the title property "Electrical Properties." The fact that the section having the title property "Ohm's Law" is a child section of the section having the title property "Electrical Properties" is demonstrated visually by the indentation of the title "Ohm's Law" relative to the title "Electrical Properties" and the indentation of the thumbnail images of the slides in the section having the title property of "Ohm's Law" relative to slides in the section having the title property "Electrical Properties."

The example interface in FIG. 3 also includes conceal icons 82A and 82B (collectively, "conceal icons 82"). When graphical interface 26 is displayed on output device 18, user 24 may use input device 14 to select one of conceal icons 82. When user 24 selects conceal icon 82A, processing unit 4 receives section concealment input that indicates that user 24 wants to conceal the thumbnail images of slides in the section having the title property "Electrical Properties." Note that in the example of FIG. 3, the slides in the section having the title property "Electrical Properties" include all slides in the section having the title property "Ohm's Law" and all slides in the section having the title property "Capacitance." In response to the section concealment input, the instructions of presentation application 22 cause processing unit 4 to update graphical interface 26 such that graphical interface 26 does not include any thumbnail images of slides in the section having the title property "Electrical Properties" (i.e., thumbnail images 78A, 78B, 78C, and 78D). The instructions of presentation application 22 may also cause processing unit 4 to update graphical interface 26 such that graphical interface 26 does not include the titles of any sections that are child sections of the section having the title property "Electrical Properties" (i.e., "Capacitance" and "Ohm's Law"). The instructions of presentation application 22 also cause processing unit 4 to display the updated graphical interface on output device 18.

The example interface in FIG. 3 also includes a reveal icon 84. The instructions of presentation application 22 may cause processing unit 4 to display a reveal icon next to a title of a section in which the thumbnail image of slides in the section are concealed. When user 24 selects reveal icon 84, processing unit 4 receives section reveal input that indicates that user 24 wants to reveal the thumbnail images of slides in the section having the title property "Capacitance." In response to the section reveal input, the instructions of presentation application 22 cause processing unit 4 to update graphical interface 26 such that graphical interface 26 includes thumbnail images of slides in the section having the title "Capacitance." The instructions of presentation application 22 then cause processing unit 4 to display the updated graphical interface on output device 18.

The example interface of FIG. 3 also includes an auto-update field 86 within slide 76. Auto-update field 86 contains the value of the title property of the section to which slide 76 belongs. In the example of FIG. 3, slide 76 belongs to the section having the title "Ohm's Law." When user 24 elects to change the value of the title property of the section to which slide 76 belongs, processing unit 4 receives title change input that indicates a new title for the section. In response to the title change input, the instructions of presentation application cause processing unit 4 to update the value of the title property displayed in auto-update field 86. It should be understood that other auto-update fields may contain values of other properties of sections. For instance, an auto-update field in a slide of a section may contain the name specified by an "author" property of the section. In this instance, if user 24 elected to change the value of the "author" property of the section, the instructions of presentation application 22 cause processing unit 4 to automatically update the name contained in the auto-update field.

The example interface of FIG. 3 also includes a link 88. During presentation of the presentation, user 24 may select link 88 in order to jump to the sequentially first slide in a presentation selection referenced by link 88. In the example of FIG. 3, selection on link 88 may cause processing unit 4 to display the sequentially first slide in the section titled "Capacitance."

User 24 can use the example interface of FIG. 3 to interact with the presentation in additional ways. For example, user 24 may use input device 14 to select a section by selecting the title (e.g., title 80C) of the section in navigation pane 72. When user 24 selects one of titles 80, processing unit 4 receives section selection input that indicates that user 24 has selected the section associated with the selected one of titles 80. In response to the section selection input, the instructions of presentation application 22 cause processing unit 4 to update graphical interface 26 such that the thumbnail images of the slides in the selected section are visually differentiated from the thumbnail images of the slides in the non-selected sections. For example, the thumbnail images of the slides in the selected section may be visually differentiated from the thumbnail images of the slides in the non-selected sections by a thicker border around the thumbnail images of the slides in the selected section.

When user 24 has selected a section, processing unit 4 may receive copy command input from user 24 and may subsequently receive paste command input from user 24. In response to the paste command input, the instructions of presentation application 22 cause processing unit 4 to copy the presentation data that defines the selected section to a location indicated by the paste command input. For instance, when the paste command input indicates a location in a second presentation, the instructions of presentation application 22 may cause processing unit 4 to copy the set of presentation data that defines the selected section to a location in the second presentation. As a result, the second presentation includes the selected section, including the data identifying the slides in the selected section and values of properties of the selected section. The copy command input may take the form of user 24 clicking on the title of a section of the presentation and the paste command input may take the form of user 24 dragging the title of the section to a location and "dropping" the title of the section at a location where the section is to be added.

Figure 4:
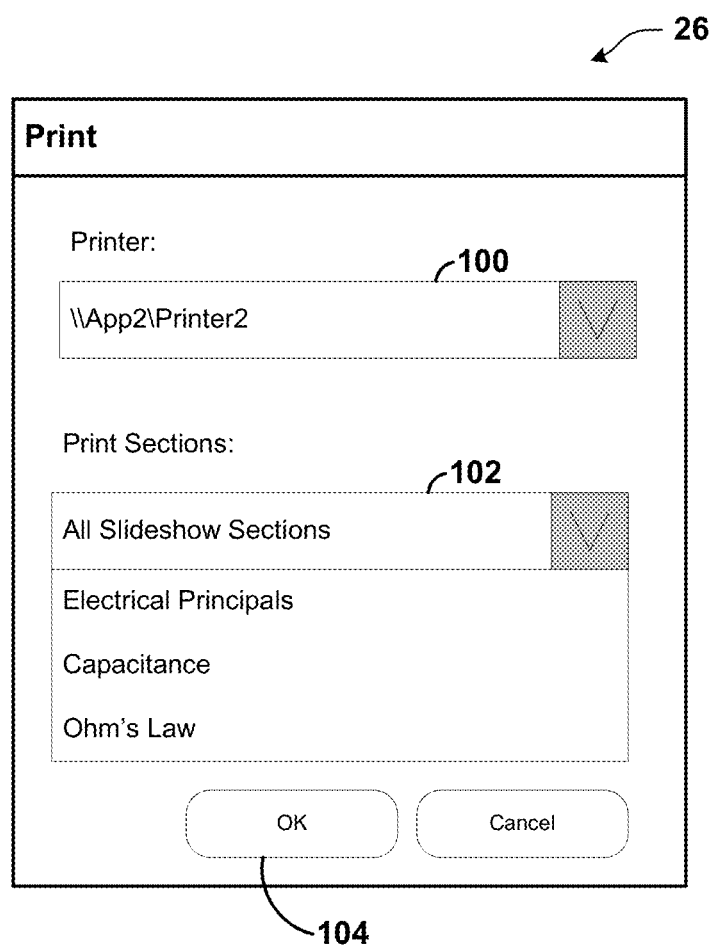
FIG. 4 illustrates an example graphical interface generated by the presentation application for printing slides in the presentation.

FIG. 4 illustrates a second example version of graphical interface 26 generated by processing unit 4 for printing slides in the presentation. In the example of FIG. 4, graphical interface 26 is a print dialog window. The instructions of presentation application 22 may cause processing unit 4 to display graphical interface 26 in response to an input from user 24 that indicates that user 24 wants to print slides in the presentation. As illustrated in the example of FIG. 4, graphical interface 26 includes a "Printer" drop box 100 that enables user 24 to select a printer with which to print the slides of the presentation. Furthermore, as illustrated in the example of FIG. 4, graphical interface 26 includes a "Print Sections" drop box 102. User 24 may interact with "Print Sections" drop box 102 to indicate that user 24 wants to print slides in all sections of the presentation or that user 24 wants to print slides only in a selected section of the presentation. When user 24 interacts with "Print Sections" drop box 102, processing unit 4 may receive section selection input that indicates one or more of the sections as selected sections. Furthermore, as illustrated in the example of FIG. 4, graphical interface 26 includes an "OK" button 104. When user 24 uses input device 14 to select "OK" button 104, processing unit 4 instructs the printing device indicated by "Printer" drop box 100 to print the slides in the selected sections.

Figure 5:
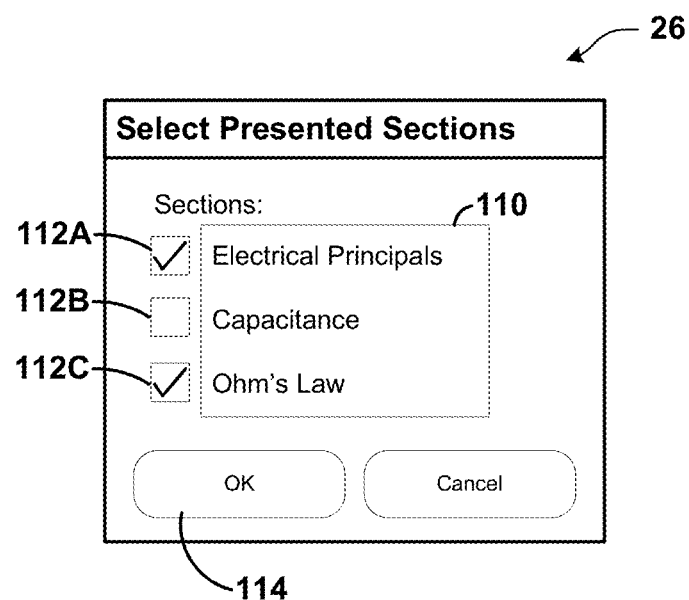
FIG. 5 illustrates an example graphical interface generated by the processing unit to select sections to include in a presentation of the presentation.

FIG. 5 illustrates a third example version of graphical interface 26 generated by processing unit 4 that enables user 24 to select sections to display in a presentation of the presentation. As illustrated in the example of FIG. 5, graphical interface 26 is a section selection dialog window. The instructions of presentation application 22 may cause processing unit 4 to display graphical interface 26 in response to an input from user 24 that indicates that user 24 wants to select sections of the presentation to be displayed in a presentation of the presentation. In the example of FIG. 5, graphical interface 26 includes a list 110 of the values of the title properties of the sections in the presentation. In addition, graphical interface 26 includes checkboxes 112A-112C (collectively, "checkboxes 112") next to each of the values of the title properties of the sections in the presentation. A checkmark in one of checkboxes 112 next to a value of the title property of one of the sections indicates that a property of the section specifies that the slides of the section are to be included in a presentation of the presentation. In the example of FIG. 5, there are checkmarks in checkboxes 112A and 112B, indicating that slides in the section titled "Electric Properties" and slides in the section titled "Ohm's Law" are to be included in a presentation of the presentation and that the slides in the section titled "Capacitance" are not to be included in the presentation of the presentation.

User 24 may use input device 14 to add or remove checkmarks from checkboxes 112. When user 24 adds a checkmark to one of checkboxes 112, processing unit 4 receives section selection input that indicates that user 24 wants slides in the section associated with the one of checkboxes 112 to be included in the presentation of the presentation. In response to the section selection input, processing unit 4 modifies the value of property of the presentation selection to indicate that the slides of the section are to be included in presentations of the presentation.

Later, processing unit 4 may receive input that indicates that user 24 wants to present the presentation. In response to this input, the instructions of presentation application 22 may cause processing unit 4 to use the value of the property of the selected section to determine whether to display the slides of the selected section. Subsequently, the instructions of presentation application 22 may cause processing unit 4 to generate a presentation graphical interface that includes a slide of the selected section when it is determined that the value of the property of the selected section indicates that the slides of the selected section are to be displayed in the presentation of the presentation. The instructions of presentation application 22 may then cause processing unit 4 to display the presentation graphical interface on output device 18. In this way, sections can be skipped seamlessly during presentation of the presentation.

Figure 6:
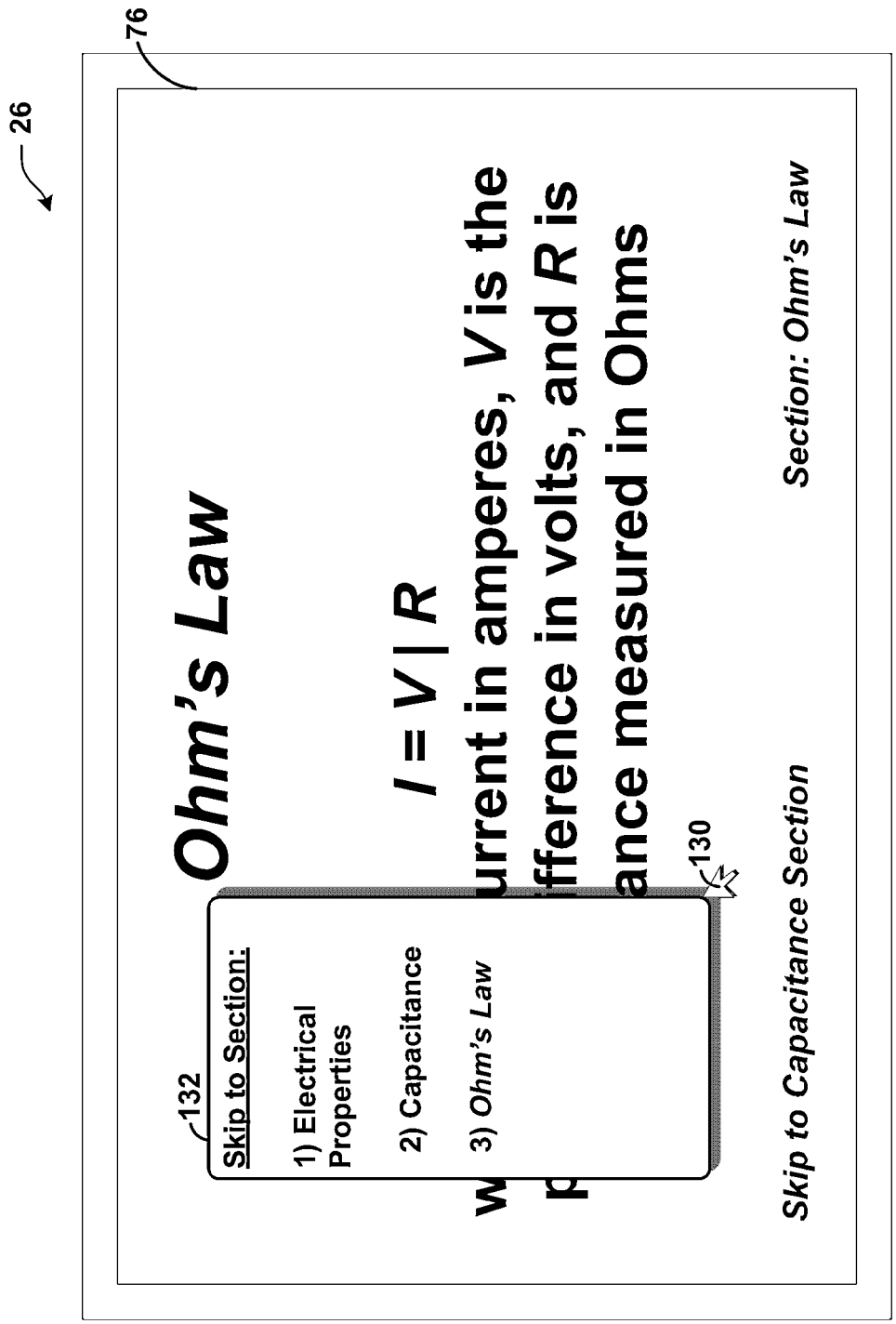
FIG. 6 illustrates an example graphical interface generated by the processing unit for presenting the presentation.

FIG. 6 illustrates a fourth example version of graphical interface 26 generated by processing unit 4 for presenting the presentation. As illustrated in the example of FIG. 6, graphical interface 26 includes slide 76 (FIG. 3). Furthermore, graphical interface 26 shows a pointer 130 controlled by user 24 using input device 14. User 24 may use input device 14 to indicate that user 24 wants to skip to a different section of the presentation. For example, user 24 may press a right mouse button of input device 14. When user 24 indicates that user 24 wants to skip to a different section of the presentation, processing unit 4 updates graphical interface 26 such that graphical interface 26 includes a menu 132 that lists the values of the title properties of the sections of the presentation. User 24 may then position pointer 130 to indicate that user 24 wants to skip to a particular section of the presentation. When user 24 indicates that user 24 wants to skip to a selected section of the presentation, processing unit 4 receives section selection input that indicates that user 24 wants output device 18 to display a sequentially first slide in the selected section. In response to the section selection input, the instructions of presentation application 22 cause processing unit 4 to update graphical interface 26 such that graphical interface 26 includes an image of the sequentially first slides in the selected section and causes processing unit 4 to display the updated graphical interface on output device 18.

Figure 7:
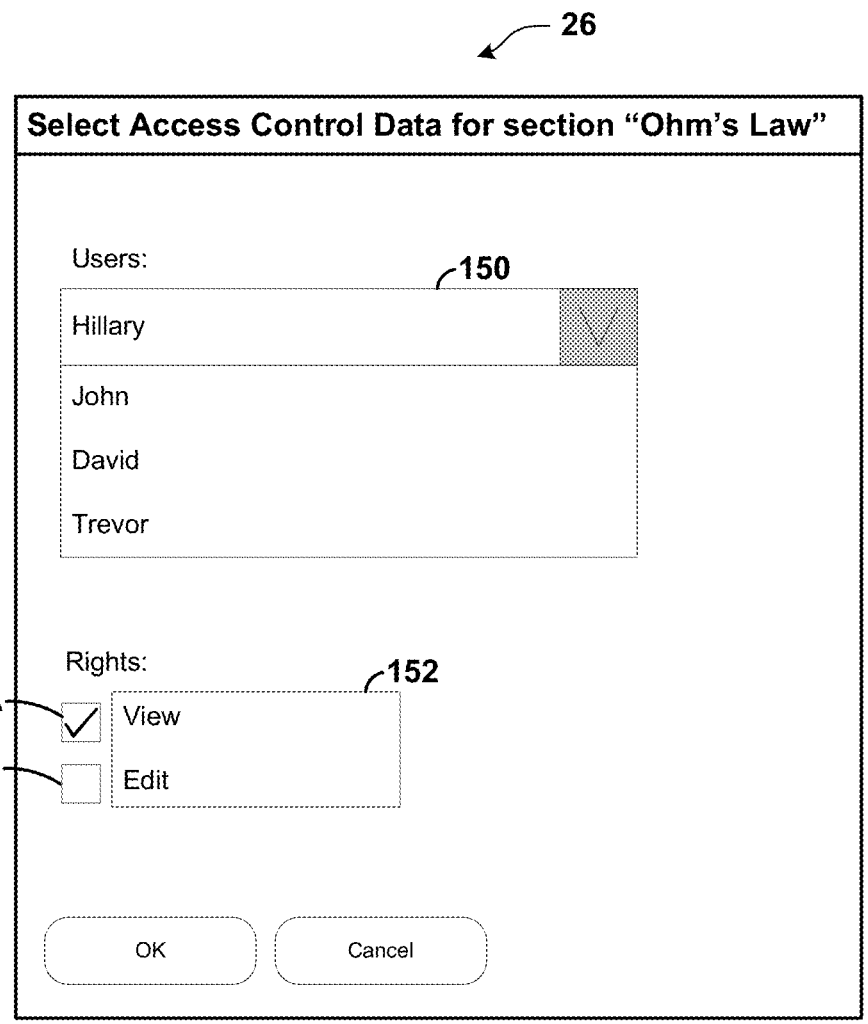
FIG. 7 illustrates an example graphical interface generated by the processing unit for defining access control data properties of a section of the presentation.

FIG. 7 illustrates a fifth example version of graphical interface 26 generated by processing unit 4 for defining access control data properties of a section of the presentation. In the example of FIG. 7, graphical interface 26 enables user 24 to select access control data for the section titled "Ohm's Law." Specifically, graphical interface 26 includes a "users" drop box 150 that enables user 24 to select another user. For instance, in the example of FIG. 7, user 24 may select users named "Hillary," "John," "David," or "Trevor." In addition, graphical interface 26 includes a list of rights 152. In the example of FIG. 7, list of rights 152 includes a right to view slides in the section titled "Ohm's Law" and a right to edit slides in the section titled "Ohm's Law." Furthermore, graphical interface 26 includes a checkbox 154A and a checkbox 154B. A checkmark in checkbox 154A indicates a property of the section titled "Ohm's Law" has a value that specifies that the user selected in "users" drop box 150 has the right to view slides in the section titled "Ohm's Law." A checkmark in checkbox 154B indicates a property of the section titled "Ohm's Law" has a value that specifies that the user selected in "users" drop box 150 has the right to edit slides in the section titled "Ohm's Law." User 24 may redefine the values of these properties by clicking on checkbox 154A and/or checkbox 154B.

It should be appreciated that values of these properties for a single user may differ among sections of the presentation. For instance, the value of the property of a first section represents a first set of access control data that specifies that a user has a right to perform an action with respect to the first section and the value of the property of the second section represents a second set of access control data that specifies that the user does not have the right to perform the action with respect to the second section.

Subsequently, processing unit 4 may receive a request from a user to perform an action (e.g., view or edit a slide) with respect to a section in the presentation. In response to receiving the request from the user to perform the action with respect to the section of the presentation, the instructions of presentation application 22 cause processing unit 4 to use these properties of the section to determine whether the user has a right to perform the action with respect to the section. If the user has the right to perform the action with respect to the section, the instructions of presentation application 22 cause processing unit 4 to perform the action. If the user does not have the right to perform the action with respect to the section, the instructions of presentation application 22 cause processing unit 4 to deny the request to perform the action.

Figure 8:
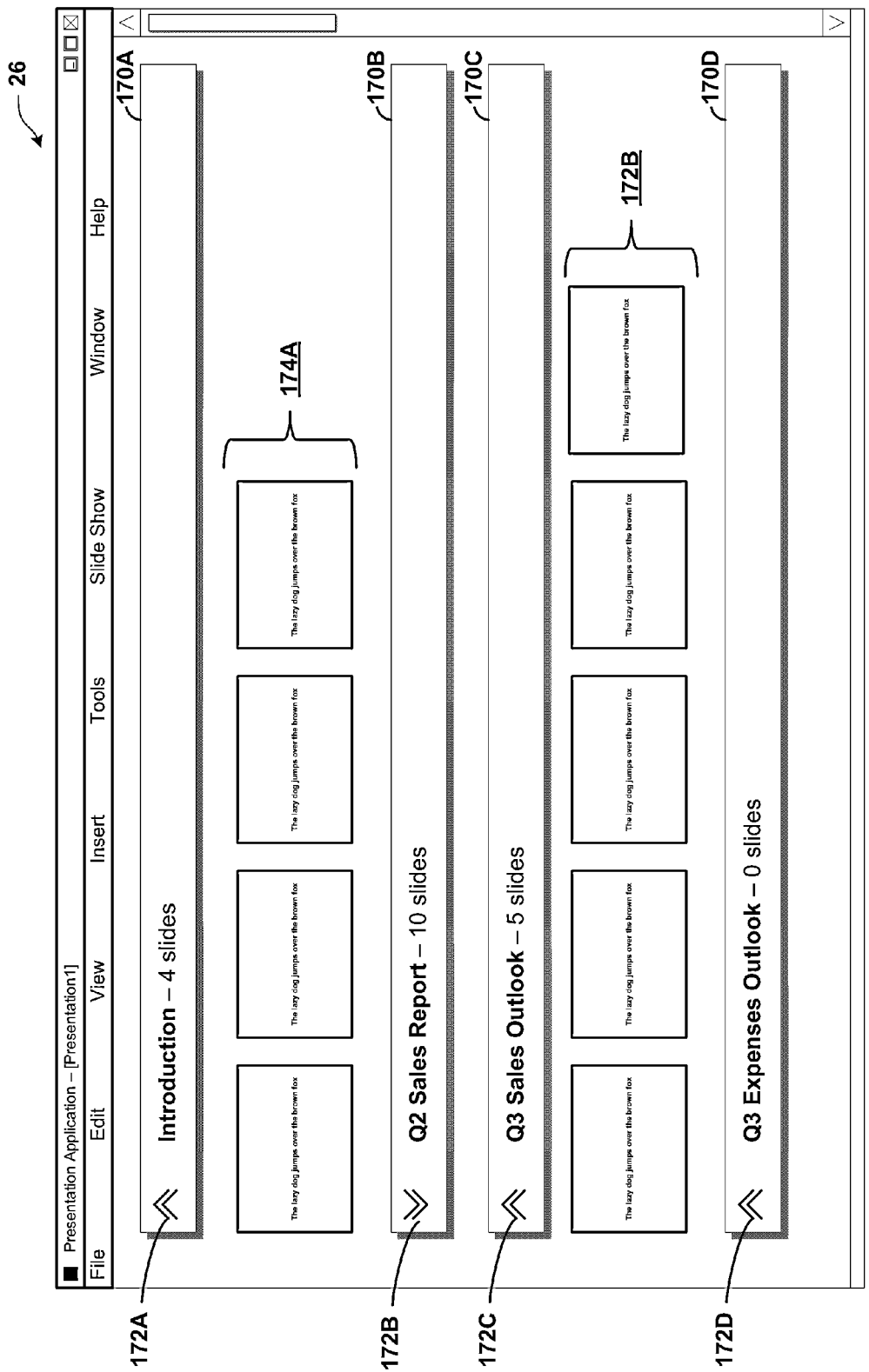
FIG. 8 illustrates a sixth example version of graphical interface 26 generated by processing unit 4 for sorting slides.

FIG. 8 illustrates a sixth example version of graphical interface 26 generated by processing unit 4 for sorting slides. As illustrated in the example of FIG. 8, graphical interface 26 includes title bars 170A, 170B, 170C, and 170D (collectively, "title bars 170"). Title bars 170 include the values of title properties of sections in a presentation. In the example of FIG. 8, title bar 170A indicates that "Introduction" is the value of a title property of a first section of a presentation, title bar 170B indicates that "Q2 Sales Report" is the value of a title property of a second section of the presentation, title bar 170C indicates that "Q3 Sales Outlook" is the value of a title property of a third section of the presentation, and title bar 170D indicates that "Q3 Expenses Outlook" is the value of a title property of a fourth section of the presentation. Title bars 170 also indicate how many slides are in each of the sections of the presentation.

Title bars 170 include icons 172A, 172B, 172C, and 172D (collectively, "icons 172") that enable user 24 to conceal or reveal thumbnail images of slides. In the example of FIG. 8, graphical interface 26 includes a set of thumbnail images 174A beneath title bar 170A that includes thumbnail images in the first section of the presentation. In addition, in the example of FIG. 8, graphical interface 26 includes a set of thumbnail images 174B beneath title bar 170C that includes thumbnail images in the third section of the presentation. User 24 may conceal thumbnail images 174A by selecting icon 172A and may conceal thumbnail images 174B by selecting icon 172C. User 24 may reveal a set of thumbnail images of the slides in the second section of the presentation by selecting icon 172B. Because the fourth section of the presentation does not include any slides, graphical interface 24 does not display any thumbnail images beneath title bar 170D.

User 24 may use this version of graphical interface 24 to organize slides of the presentation into sections. For example, user 24 may use input device 14 to select one of thumbnail images 174A. User 24 may then drag the selected thumbnail image of the slide to an area of graphical interface 26 beneath one of title bars 170. When user 24 has dragged the thumbnail image of the slide to the area of graphical interface 26 beneath one of title bars 170, the slide is removed from the first section added to the section of the presentation associated with the title bar. For instance, user 24 drags the selected thumbnail image of the slide to an area of graphical interface 26 beneath title bar 170D, the slide is removed from the first section and added to the fourth section.

User 24 may interact with the presentation in a variety of ways by selecting title bars 170. For instance, by selecting title bars 170, user 24 may change the values of the title properties of the sections of the presentation. In another instance, by selecting title bars 170, user 24 may add a set of keywords that enable a search engine to identify a section within the presentation. In each of these instances, when user 24 selects one of title bars 170, processing unit 4 receives input and the instructions of presentation application 22 cause processing unit 4 to perform an action in response.

Figure 9:
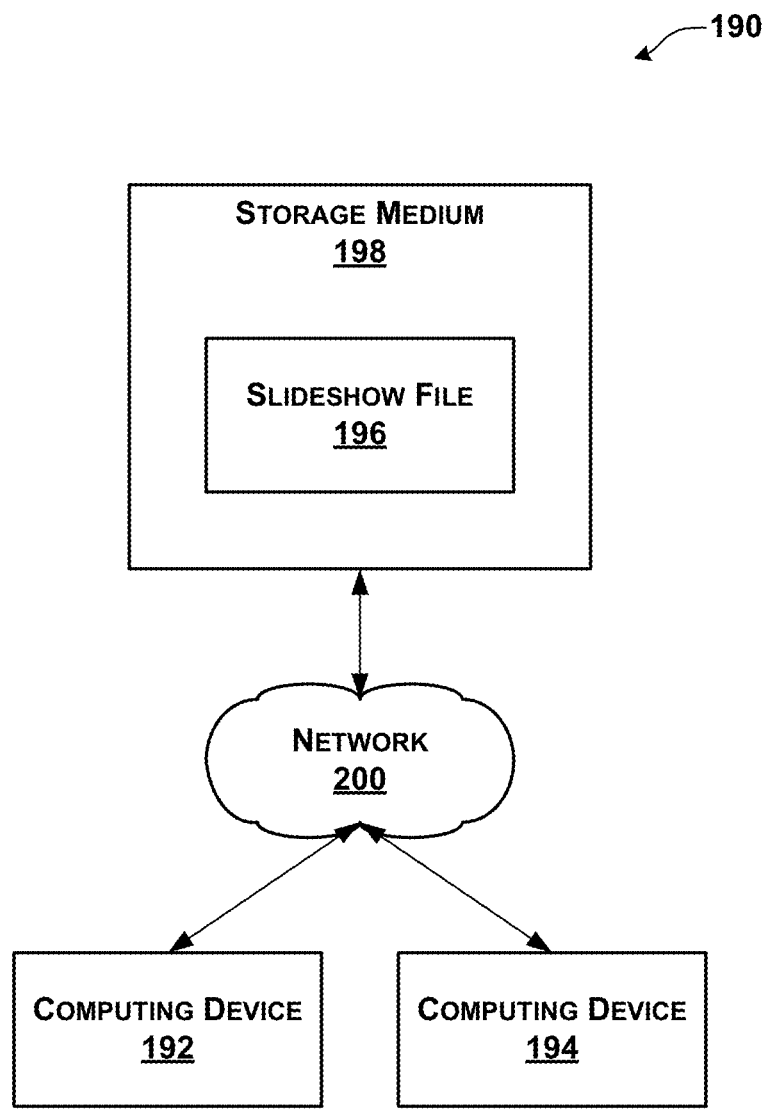
FIG. 9 illustrates an example system in which multiple computing devices simultaneously access a presentation file stored in a storage medium accessible by a network.

FIG. 9 illustrates an example system 190 in which multiple computing devices 192 and 194 simultaneously access a presentation file 196 stored in a storage medium 198 accessible by a network 200. In system 190, presentation file 196 may include a first set of section data that defines a first section and a second set of section data that defines a second section. Because the first set of section data and the second set of section data are logically distinct within presentation file 196, a user of computing device 192 may edit slides in the first section of the presentation at the same time that a user of computing device 194 is editing slides in the second section of the presentation. This may enable these users to work on the presentation in a collaborative fashion.

It is to be understood that the implementations described herein may be implemented by hardware, software, firmware, middleware, microcode, or any combination thereof. When the systems and/or methods are implemented in software, firmware, middleware or microcode, program code or code segments, they may be stored in a computer-readable storage medium, such as a storage component. A code segment may represent a procedure, a function, a subprogram, a program, a routine, a subroutine, a module, a software package, a class, or any combination of instructions, data structures, or program statements A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

Furthermore, it is to be understood that computing device 2 may have additional features or functionality. For example, computing device 2 may also include additional data storage devices (removable and/or non-removable) such as, for example, magnetic disks, optical disks, or tape. Computer-readable storage media may include volatile and nonvolatile, removable and non-removable media implemented in any method or technology for storage of information, such as computer readable instructions, data structures, program modules, or other data.

For a software implementation, the techniques described herein may be implemented with modules (e.g., procedures, functions, and so on) that perform the functions described herein. The software codes and instructions may be stored in computer-readable storage media and executed by processors. The memory unit may be implemented within the processor or external to the processor, in which case it can be communicatively coupled to the processor via various means as is known in the art.

These techniques may be realized in several ways. For example, these techniques may be conceptualized as a method for organizing slides of an electronic slide presentation. The method comprises accessing, with a computing device, a presentation file stored on a computer-readable storage medium, the presentation file containing: (i) a first set of section data that defines a first section, the first set of section data identifying a first set of slides and identifying data that specifies a user-defined value of a property of the first section other than the first set of slides, and (ii) a second set of section data that defines a second section, the second set of section data identifying a second set of slides and identifying data that specifies a user-defined value of a property of the second section other than the second set of slides. The method also comprises generating, at the computing device, a graphical interface using the value of the property of the first section and the value of the property of the second section, the graphical interface enabling a user to interact with an electronic presentation that includes the slides in the first set of slides and the slides in the second set of slides. In addition, the method comprises displaying the graphical interface on an output device.

In another example, the techniques of this disclosure may be realized as a computing device comprising a processing unit that is capable of executing instructions, an output device, and a storage medium. The storage medium comprises a presentation file stored on a computer-readable storage medium, the presentation file containing: (i) a first set of section data that defines a first section, the first set of section data identifying a first set of slides and identifying data that specifies a user-defined value of a property of the first section other than the first set of slides, and (ii) a second set of section data that defines a second section, the second set of section data identifying a second set of slides and identifying data that specifies a user-defined value of a property of the second section other than the second set of slides. The computer-readable storage medium also comprises instructions that, when executed by the processing unit, cause the processing unit to: access the presentation file; generate a graphical interface using the value of the property of the first section and the value of the property of the second section, the graphical interface enabling a user to interact with an electronic presentation that includes the slides in the first set of slides and the slides in the second set of slides; and display the graphical interface on the output device.

In another example, the techniques of this disclosure may be realized as a computer-readable storage medium comprising a presentation file stored on a computer-readable storage medium, the presentation file containing: (i) a first set of section data that defines a first section, the first set of section data identifying a first set of slides, identifying data that specifies a title of the first section, and identifying data that specifies a user-defined value of a property of the first section that represents a first set of access control data that specifies that the user has a right to perform an action with respect to the first section, and (ii) a second set of section data that defines a second section, the second set of section data identifying a second set of slides, identifying data that specifies a title of the second section, and identifying data that specifies a user-defined value of a property of the second section that represents a second set of access control data that specifies that the user does not have the right to perform the action with respect to the second section. The computer-readable storage medium also comprises instructions that, when executed by a processing unit of a computing device, cause the processing unit to access the presentation file. The instructions also cause the processing unit to generate a graphical interface that displays the title of the first section and the title of the second section. Furthermore, the instructions cause the processing unit to receive a request from the user to perform the action with respect to the first section. The instructions also cause the processing unit to, in response to receiving the request from the user to perform the action with respect to the first section, determine that the second set of access control data specifies that the user does not have the right to perform the action with respect to the second section; and perform the action with respect to the first section. In addition, the instructions cause the processing unit to receive a request from the user to perform the action with respect to the second section. Furthermore, the instructions cause the processing unit to, in response to receiving the request from the user to perform the action with respect to the second section, determine that the second set of access control data specifies that the user does not have the right to perform the action with respect to the second section and deny the request to perform the action with respect to the second section.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for providing access to an electronic file based on user-definable properties, comprising:
   accessing, with a computing device, the electronic file stored on a computer-readable storage medium, the electronic file comprising:
      a first set of data within the electronic file comprising a first set of access control data, the first set of access control data specifying at least a first action that a user has a right to perform on the first set of data, wherein the first set of access control data is received via a user interface operable to identify a set of data and one or more actions that may be performed on the set of data; and
      a second set of data within the electronic file comprising a second set of access control data, the second set of access control data specifying at least a second action that a user has a right to perform on the second set of data, wherein the second set of access control data is received via the user interface;
   receiving, at the computing device, a request from the user to perform a first user action with respect to the first set of data;
   in response to receiving the request from the user to perform the first user action with respect to the first set of data:
      determining, by the computing device, whether the user has the right to perform the first user action with respect to the first set of data based upon the first set of access control data;
      when the user has the right to perform the first user action with respect to the first set of data, performing, by the computing device, the first user action with respect to the first set of data; and
      when the user does not have the right to perform the first user action with respect to the first set of data, denying, by the computing device, the request to perform the first user action with respect to the first set of data.

2. The method of claim 1, wherein the first user action comprises viewing the first set of data.

3. The method of claim 1, wherein the first user action comprises editing the first set of data.

4. The method of claim 1, further comprising:
   receiving, at the computing device, a request from the user to perform a second user action with respect to the second set of data;
   in response to receiving the request from the user to perform the second action with respect to the second set of data:
      determining, by the computing device, whether the user has the right to perform the second action with respect to the second set of data based upon the second set of access control data;
      when the user has the right to perform the second action with respect to the second set of data, performing, by the computing device, the second action with respect to the second set of data; and
      when the user does not have the right to perform the second action with respect to the second set of data, denying, by the computing device, the request to perform the second action with respect to the second set of data.

5. The method of claim 4, wherein the second user action comprises one of viewing or editing the second set of data.

6. The method of claim 1, further comprising:
   displaying a graphical interface that includes user names associated with the electronic file.

7. The method of claim 6, wherein the user names are selected from a drop box.

8. The method of claim 6, wherein the graphical interface graphically indicates which user name has the right to perform an edit action.

9. A computing device, comprising:
   a processing unit;
   a storage medium including instructions, which when executed by the processing unit, cause the computing device to be operable to:
      access, with a computing device, an electronic file stored on a computer-readable storage medium, the electronic file containing:
         a first set of data within the electronic file comprising a first set of access control data, the first set of access control data specifying at least a first action that a user has a right to perform on the first set of data, wherein the first set of access control data is received via a user interface operable to identify a set of data and one or more actions that may be performed on the set of data; and a second set of data within the electronic file comprising a second set of access control data, the second set of access control data specifying at least a second action that a user has a right to perform on the second set of data, wherein the second set of access control data is received via the user interface;

receiving, at the computing device, a request from the user to perform a first user action with respect to the first set of data;

in response to receiving the request from the user to perform the first user action with respect to the first set of data:

determining, by the computing device, whether the user has the right to perform the first user action with respect to the first set of data based upon the first set of access control data;

when the user has the right to perform the first user action with respect to the first set of data, performing, by the computing device, the first user action with respect to the first set of data; and when the user does not have the right to perform the first user action with respect to the first set of data, denying, by the computing device, the request to perform the first user action with respect to the first set of data.

10. The computing device of claim 9, wherein the first user action comprises viewing the first set of data.

11. The computing device of claim 9, wherein the first user action comprises editing the first set of data.

12. The computing device of claim 9, wherein the computing device is further operable to:

receive, at the computing device, a request from the user to perform a second user action with respect to the second set of data;

in response to receiving the request from the user to perform the second user action with respect to the second set of data:

determine, by the computing device, whether the user has the right to perform the second action with respect to the second set of data based upon the second set of access control data;

when the user has the right to perform the second action with respect to the second set of data, perform, by the computing device, the second action with respect to the second set of data; and when the user does not have the right to perform the second action with respect to the second set of data, deny, by the computing device, the request to perform the second action with respect to the second set of data.

13. The computing device of claim 12, wherein the second user action comprises one of viewing or editing the second set of data.

14. The computing device of claim 9, further comprising: displaying a graphical interface that includes user names associated with the electronic file.

15. The computing device of claim 14, wherein the user names are selected from a drop box.

16. The computing device of claim 14, wherein the graphical interface graphically indicates which user name has the right to perform an edit action.

17. A computer-readable storage medium having computer-executable instructions that, when executed by a processing unit, cause the processing unit to perform steps comprising:

accessing, with a computing device, an electronic file stored on a computer-readable storage medium, the electronic file containing:

a first set of data within the electronic file comprising a first set of access control data, the first set of access control data specifying that a user has a right to perform an action with respect to the first set of data, wherein the first set of access control data is received via a user interface operable to identify a set of data and one or more actions that may be performed on the set of data; and a second set of data within the electronic file comprising a second set of access control data, the second set of access control data specifying that the user does not have a right to perform the action with respect to the second set of data, wherein the second set of access control data is received via the user interface;

receiving, at the computing device, a request from the user to perform the action with respect to the first set of data;

in response to receiving the request from the user to perform the action with respect to the first set of data:

determining, by the computing device, whether the user has the right to perform the action with respect to the first set of data based upon the first set of access control data; and after determining that the user has the right to perform the action with respect to the first set of data, performing, by the computing device, the action with respect to the first set of data;

receiving, at the computing device, a request from the user to perform the action with respect to the second set of data; and in response to receiving the request from the user to perform the action with respect to the second set of data:

determining, by the computing device, whether the user does not have the right to perform the action with respect to the second set of data based upon the second set of access control data; and after determining that the user does not have the right to perform the action with respect to the second set of data, denying, by the computing device, the request to perform the action with respect to the second set of data.

18. The computer-readable storage medium of claim 17, wherein the action comprises one of viewing or editing.

19. The computer-readable storage medium of claim 17, further comprising:

displaying a graphical interface that includes user names associated with the electronic file.

20. The computer-readable storage medium of claim 19, wherein the graphical interface graphically indicates which user name has the right to perform an edit action.

* * * * *